US011763015B2

(12) United States Patent
Sislow et al.

(10) Patent No.: US 11,763,015 B2
(45) Date of Patent: Sep. 19, 2023

(54) SECURELY PROCESSING SHAREABLE DATA UTILIZING A VAULT PROXY

(71) Applicant: Sympatic, Inc., Chicago, IL (US)

(72) Inventors: Joseph Sislow, Evanston, IL (US); Piers Nash, Chicago, IL (US)

(73) Assignee: Sympatic, Inc., Chicago, IL (US)

( * ) Notice: Subject to any disclaimer, the term of this patent is extended or adjusted under 35 U.S.C. 154(b) by 479 days.

(21) Appl. No.: 16/946,985

(22) Filed: Jul. 14, 2020

(65) Prior Publication Data
US 2022/0019682 A1    Jan. 20, 2022

(51) Int. Cl.
G06F 21/62    (2013.01)
G06F 9/455    (2018.01)
H04L 67/56    (2022.01)

(52) U.S. Cl.
CPC ...... G06F 21/6218 (2013.01); G06F 9/45558 (2013.01); H04L 67/56 (2022.05); G06F 2009/45579 (2013.01); G06F 2009/45587 (2013.01); G06F 2221/2141 (2013.01)

(58) Field of Classification Search
CPC ............ G06F 21/6218; G06F 9/45558; G06F 2009/45579; G06F 2009/45587; G06F 2221/2141; G06F 21/6245; H04L 67/56; H04L 67/562; H04L 67/563
See application file for complete search history.

(56) References Cited

U.S. PATENT DOCUMENTS 9,509,692 B2 * 11/2016 Innes ................. H04L 63/0823
2006/0156392 A1 * 7/2006 Baugher ................ G06F 21/10
726/5
2014/0331297 A1 * 11/2014 Innes ................. H04L 63/0823
726/7
2019/0121960 A1 * 4/2019 Brown ..................... G06F 21/53
2020/0014691 A1 * 1/2020 Ortiz ..................... H04L 9/3234

OTHER PUBLICATIONS

"How mitmproxy works," the mitmproxy project. 2016. Retrieved Jul. 10, 2020. retrieved from the internet: <URL: https://mitmproxy.readthedocs.io/en/v2.0.2/howmitmproxy.html>.
Banerjee, "Squid: Master This Proxy Server," Linux For You. May 2003. pp. 55-62.

* cited by examiner

Primary Examiner — Bruce S Ashley
(74) Attorney, Agent, or Firm — Garlick & Markison; Timothy W. Markison; Timothy D. Taylor

(57) ABSTRACT

A method includes a data processing system creating a proxy for a virtual vault to access a data owner system in accordance with a temporary credential protocol, where the proxy is the only conduit between the virtual vault and the data owner system. The method continues by the proxy receiving a request from a virtual machine within the virtual vault, requesting data from the data owner system. When the request is valid, the method continues by the proxy creating a data retrieval request based on the request and data access credentials associated with the data owner system. The method continues by the proxy forwarding a data response from the data owner system to the virtual machine. The method continues by the data processing system deleting the proxy and the virtual vault when a data query has been completed, where the request is in accordance with the data query.

18 Claims, 23 Drawing Sheets computing device 15

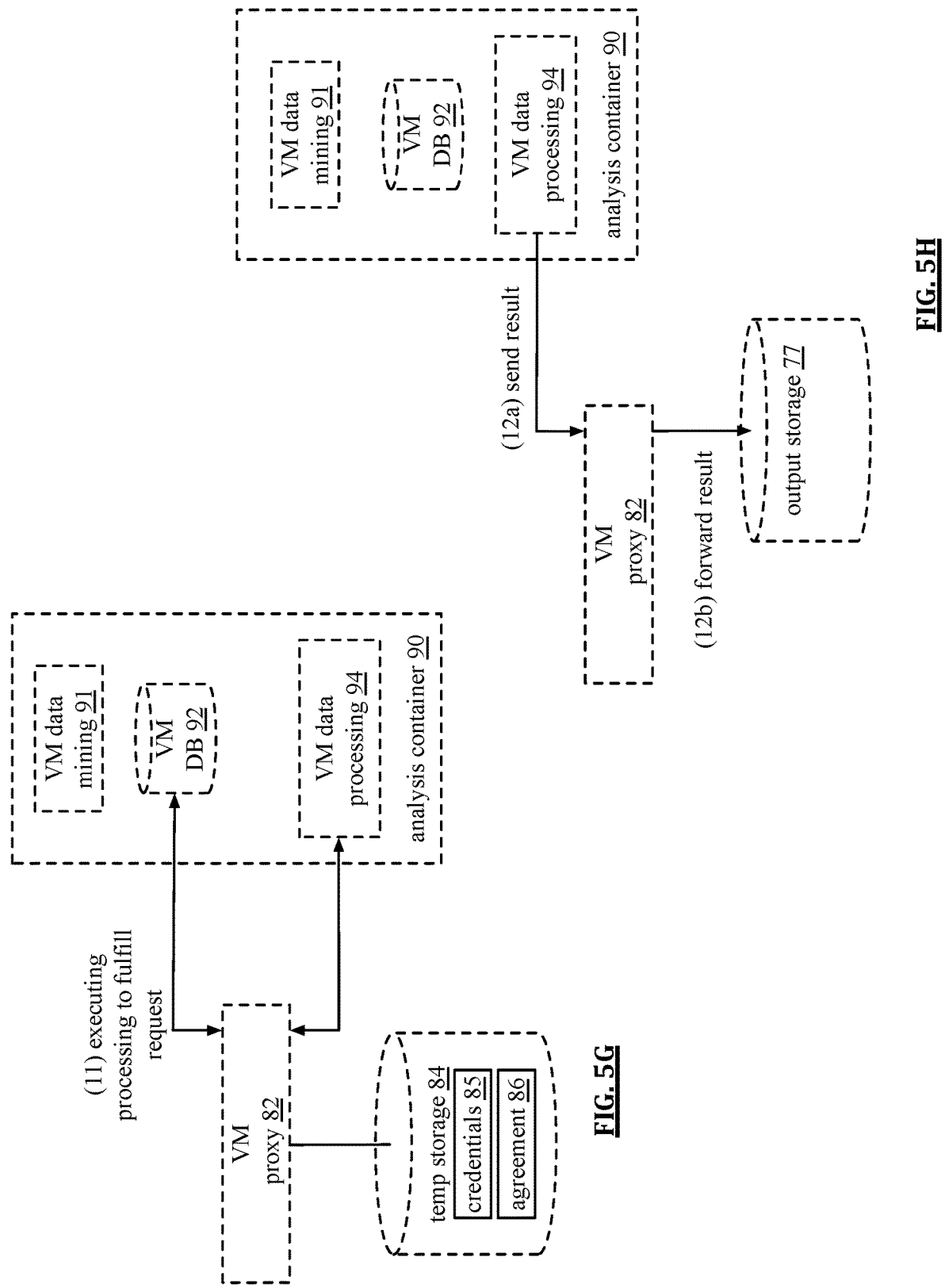

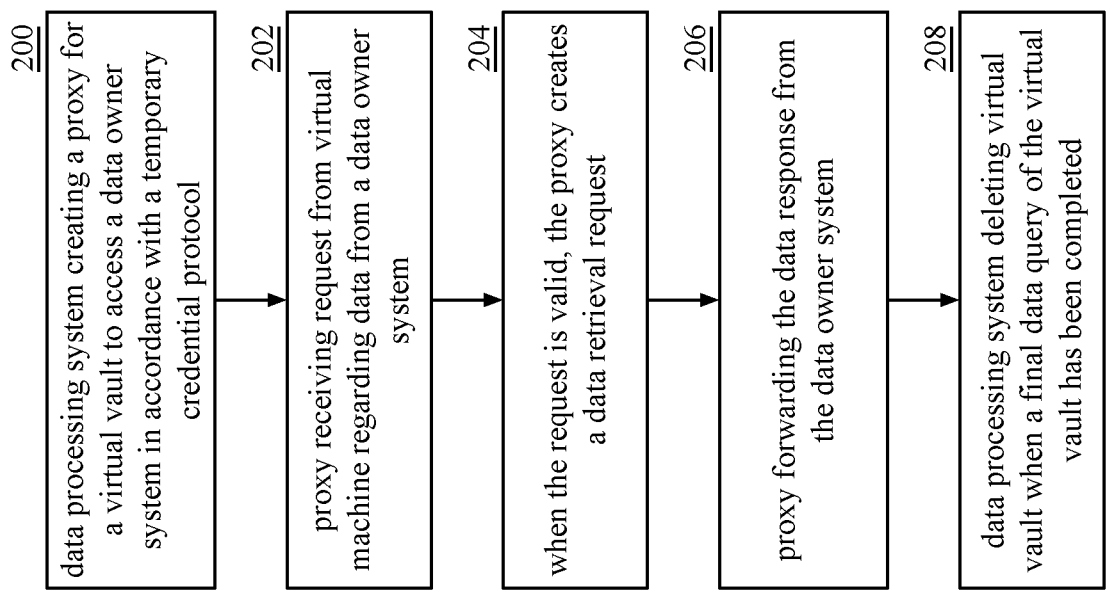

SECURELY PROCESSING SHAREABLE DATA UTILIZING A VAULT PROXY

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to securely processing data.

Description of Related Art

As is known, data is collected for a variety of events. The events include sleeping, exercising, social media interactions, purchases, hospital visits, doctor's visits, urgent care visits and many more. As is further known, the collected data may be stored by one or more computers for later retrieval and/or analysis.

As is further known, data is stored in a variety of formats based on different data storage protocols. For example, data can be stored in text formats, video formats, graphics formats, image formats, and audio formats. The format used by one entity to store similar types of data (e.g., patient records) is often different than the format used by another entity. This makes it difficult to share data.

Another issue with sharing data is data privacy. For example, the health insurance portability and accountability act (HIPAA) mandates that hospitals, doctors, pharmacists, and/or other entities that handle medical records, must keep the patient's personal information in confidence. To do this, most entities do not share medical record data or any portion thereof. As another example, general data protection regulation (GDPR) restricts the sharing of personal information regarding any type of data.

Another issue with sharing data is data tracking. For example, when an entity shares some of its data, the entity that shared the data does not know how the data and/or information associated with the data is being processed and/or analyzed.

BRIEF DESCRIPTION OF THE SEVERAL VIEWS OF THE DRAWING(S)

Figure 4A:
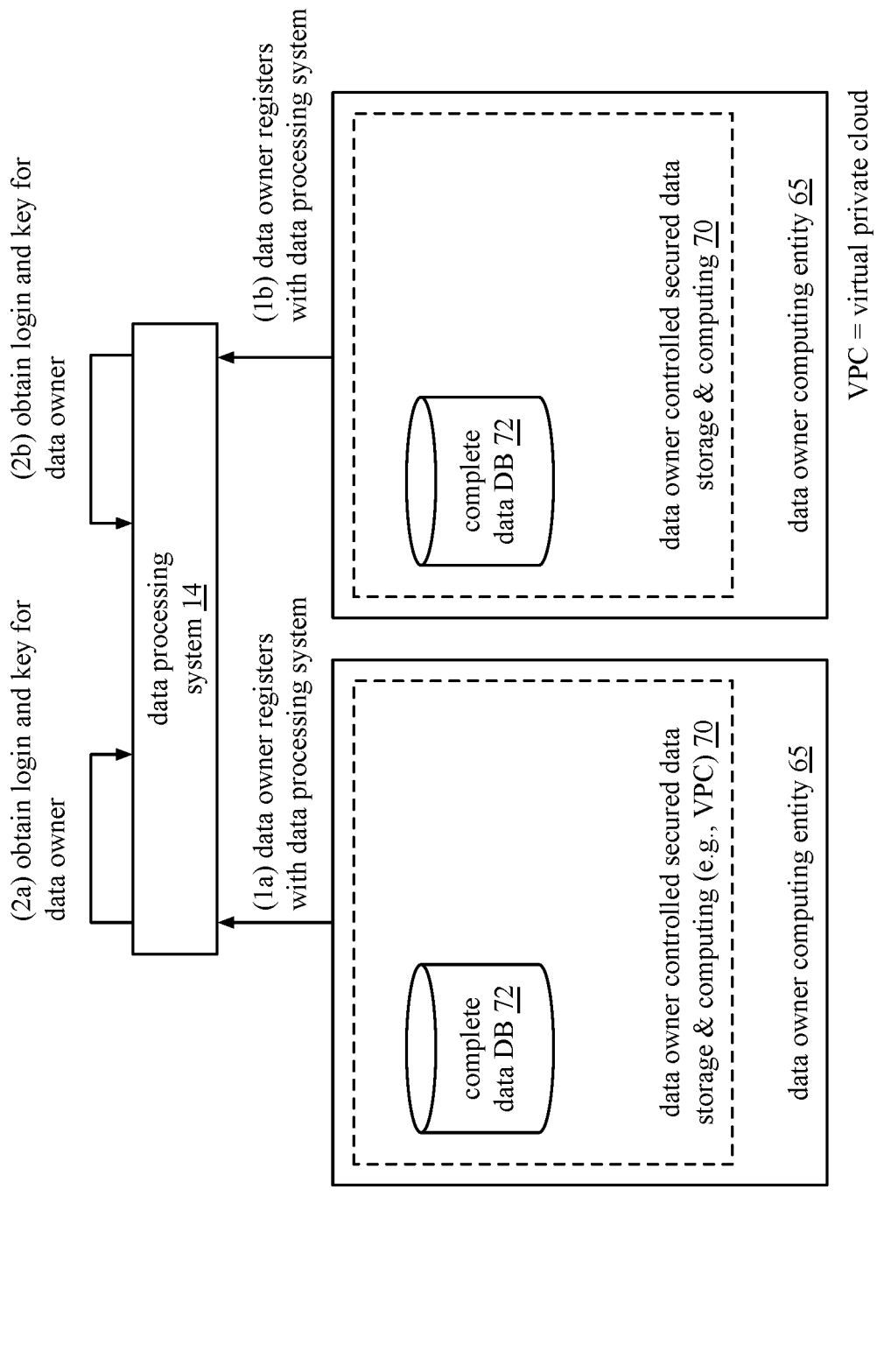
Figure 4B:
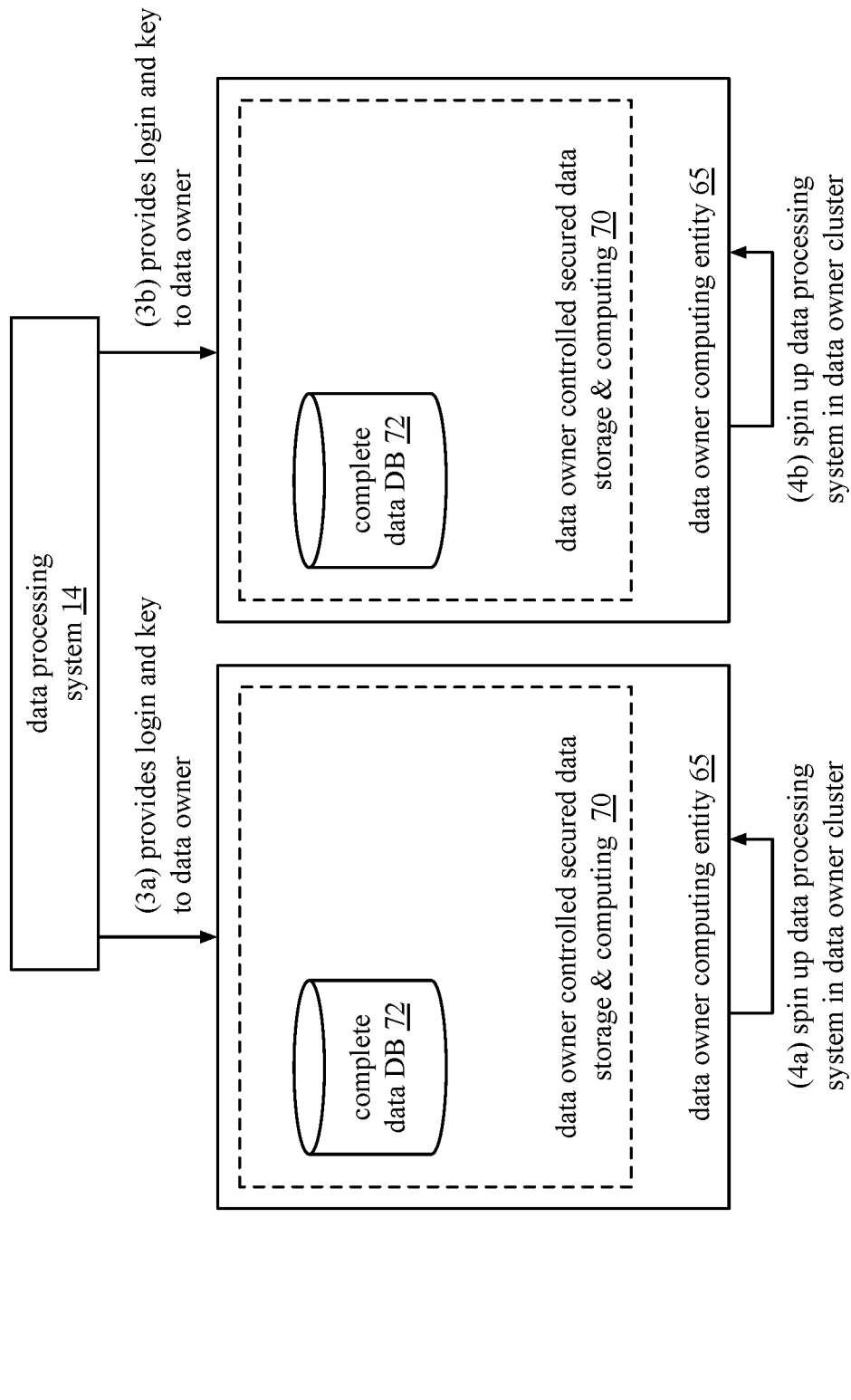
Figure 4C:
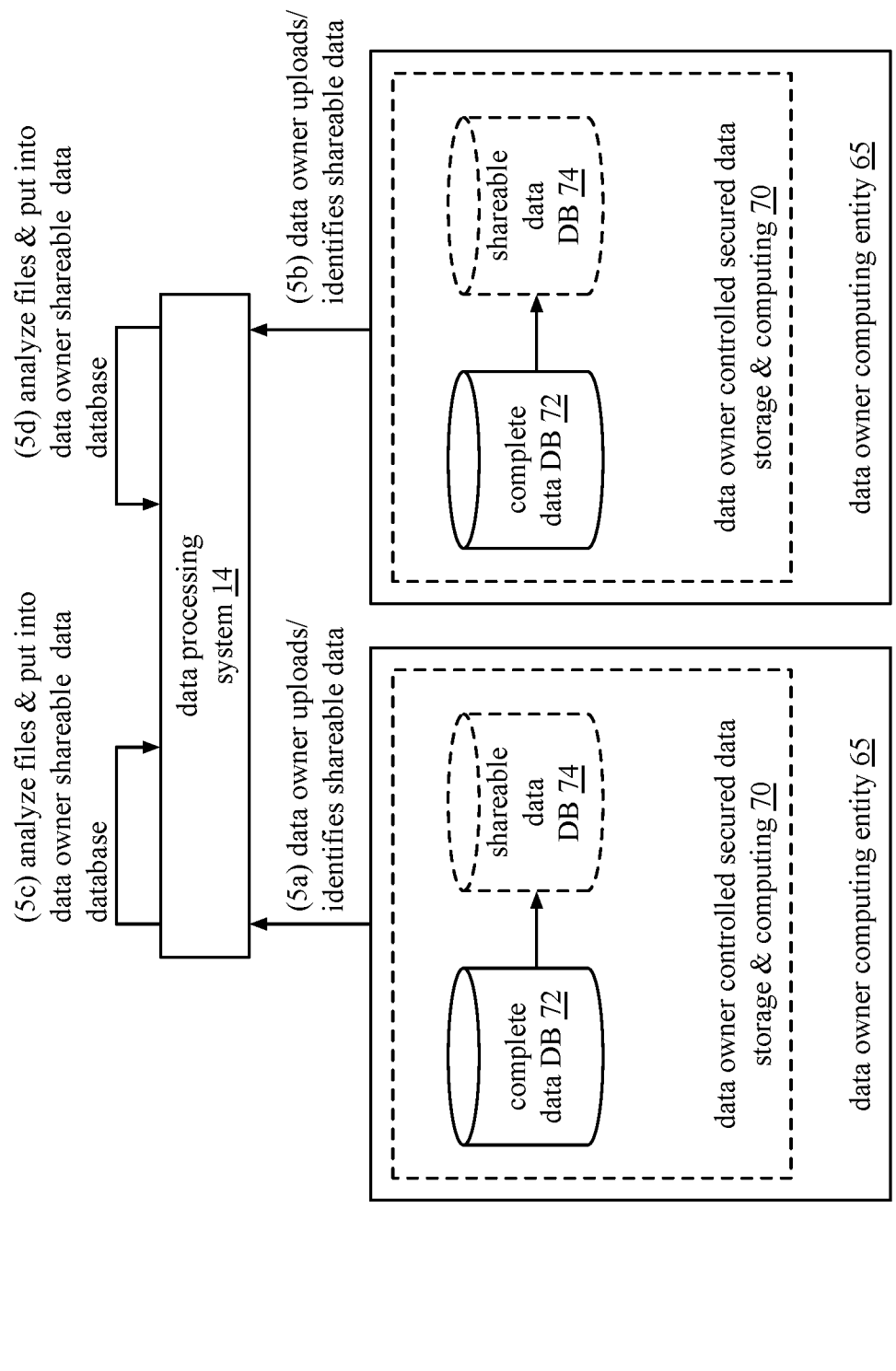
Figure 5A:
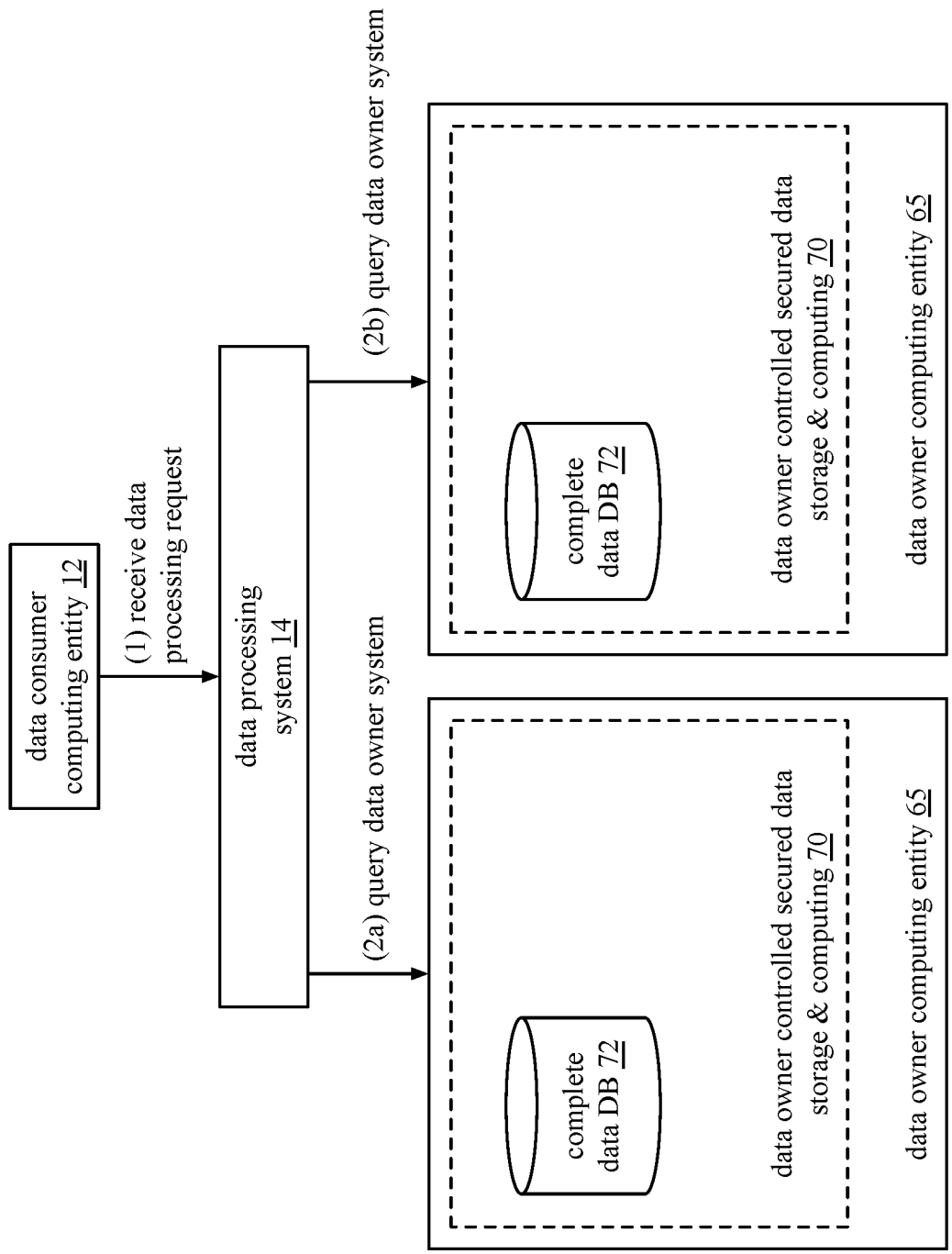

FIGS. 4A-C are schematic block diagrams of an example of setting up shareable data access in a data communication system in accordance with the present invention;

FIGS. 5A-J are schematic block diagrams of an example of securely processing a data access request in accordance with the present invention; and FIG. 5K is a flowchart of an example of a method of processing a data access request via a proxy in accordance with the present invention.

DETAILED DESCRIPTION OF THE INVENTION

Figure 1:
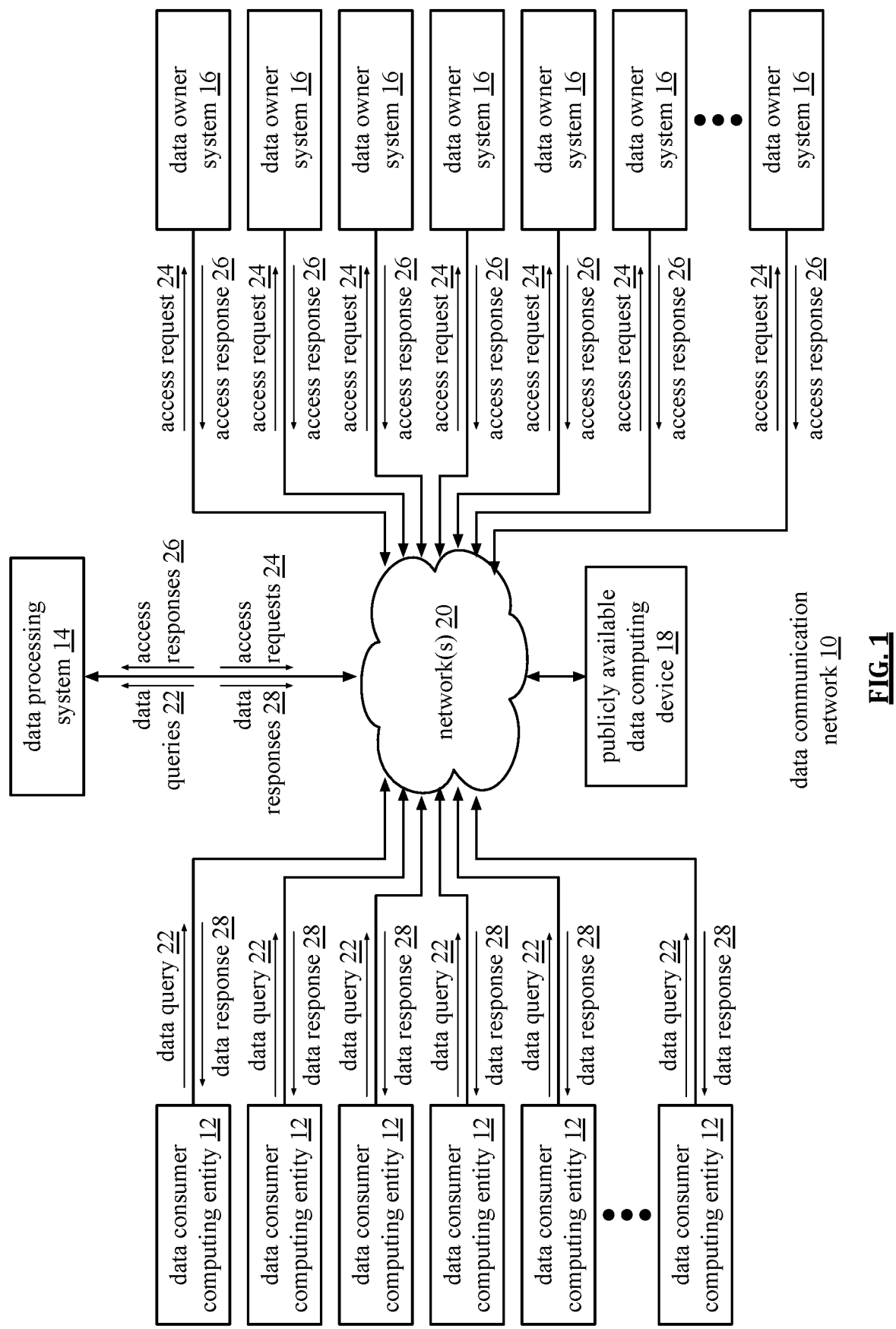
FIG. 1 is a schematic block diagram of an embodiment of a data communication network in accordance with the present invention.

FIG. 1 is a schematic block diagram of a data communication network that includes a plurality of data consumer computing entities 12, a data processing system 14, a plurality of data owner systems 16, and one or more publicly available data computing devices 18 coupled via one or more networks 20. A network 20 may be a wide area network (WAN), a wireless WAN, a local area network (LAN), or a wireless LAN. A data consumer computing entity 12 includes one or more computing devices operated by a data consumer (e.g., a researcher, a hospital administrator, an insurance administrator, an engineer, a designer, a governmental agency, etc.). Note that the data processing system, the data owner system and/or the public available data computing device may include or be referred to as a computing device. An example of a computing device is described with reference to FIG. 2.

The data processing system 14 includes one or more computing entities (e.g., one or more computing devices) to process data queries 22 and to provide data responses 28. Each of the data owner systems 16 includes one or more computing entities (e.g., one or more computing devices) and functions to provide data access responses 26 to the data processing system 15 in accordance with data access requests 24. The publicly available data computing device 18 provides publicly available data (e.g., weather information, traffic information, sales information, demographic information, etc.) to the data processing system 14.

The data processing system 14 is operable to receive data queries 22 from the data consumer computing entities 12. For example, the data processing system receives a query 22 regarding a number of reported infections of a disease (e.g., human coronavirus, influenza, measles, etc.) in a particular region and/or timeframe. As another example, the data processing system receives a query regarding symptoms reported by patients currently taking a first medication and a second medication. As yet another example, the data processing system receives a query regarding a correlation of asthma and living with a smoker. These are but a few of the thousands or more queries that could be processed by the data processing system 14.

In response to the query, the data processing system 14 identifies one or more data owners (e.g., a controlling entity for a data owner system 16) and asks them to share their data. As an example, if the query 22 is regarding a number of reported infections of influenza in the state of Illinois in the last 7 days, the data processing system 14 will ask data owner systems 16 such as hospitals, doctors, governmental agencies, testing site, operators, etc. to participate in the query 22. In an instance, the data owners' physical location is utilized to determine which data owner systems to ask (e.g., any Illinois address plus addresses within a threshold distance (e.g., 5 miles, 30 miles, etc.) and/or threshold travel time (e.g., 20 min walk, 30 min bus ride, etc) of Illinois border). Alternatively, or in addition to, the data owners register with the data processing system and identify data records they are willing to share and/or give access to and the data processing system determines, based on the query, which identified data records are related to the query.

For each data owner system 16 that agrees to share their data, the data processing system 14 and the data owner system 16 work together to provide shareable data, as the access response 26. In one example, the shareable data is any data exchanged from a data owner system with another computing entity in accordance with an agreement between the computing entity and the data owner system. As another example, the shareable data is any data that complies with a privacy regulation (e.g., HIPAA, protected health information (PHI), personally identifiable information (PII), etc.) As another example, the shareable data is any data that the data owner system determines to share according to its privacy policy. As one specific example, the shareable data includes a listing of patients (with identities anonymized) that are have tested positive for influenza within the last 7 days. As another specific example, the shareable data includes birthdays (with formats normalized) for patients with a heart problem. The normalizing and/or anonymizing of the shareable data will be discussed in one or more subsequent figures.

The data processing system 14 processes the access responses 26 from the data owner systems 16 participating in this query 22 to produce a data response 28. For example, the data response 28 may include a percentage of patients that have tested positive for influenza in the last week. As another example, the data response 28 may include a list of symptoms of patients that were taking a particular combination of medications. As yet another example, the data response may indicate the data processing system cannot perform the result (e.g., not enough data, result not in accordance with agreement (e.g., result data greater than an agreed data size limit, etc.)).

Once the data response 28 is completed, the shareable data is deleted. In addition, the data processing system 14 isolates the shareable data of the data owner systems 16 from each other and from the data consumer computing entities 12. In this manner, the ability to conduct queries (e.g., research) is greatly enhanced while maintaining privacy of data from a vast number of data sources.

While the above examples were regarding medical data, the data stored by the data owner systems may be of any type. For example, a first data owner system stores social media information regarding it members, a second data owner system is a retailer that stores customer purchase transactions, a third data owner system stores medical information regarding its patients, a fourth data owner system stores insurance information regarding its customers, a fifth data owner system stores on-line delivery transactions (e.g., meal orders, groceries, rides, etc.), and so on. Data queries can be for a particular type of data (e.g., medical data) or they can be regarding a broad spectrum of data (e.g., medical data, shopping habit data, sleeping data, eating data, driving data, etc.).

Figure 2:
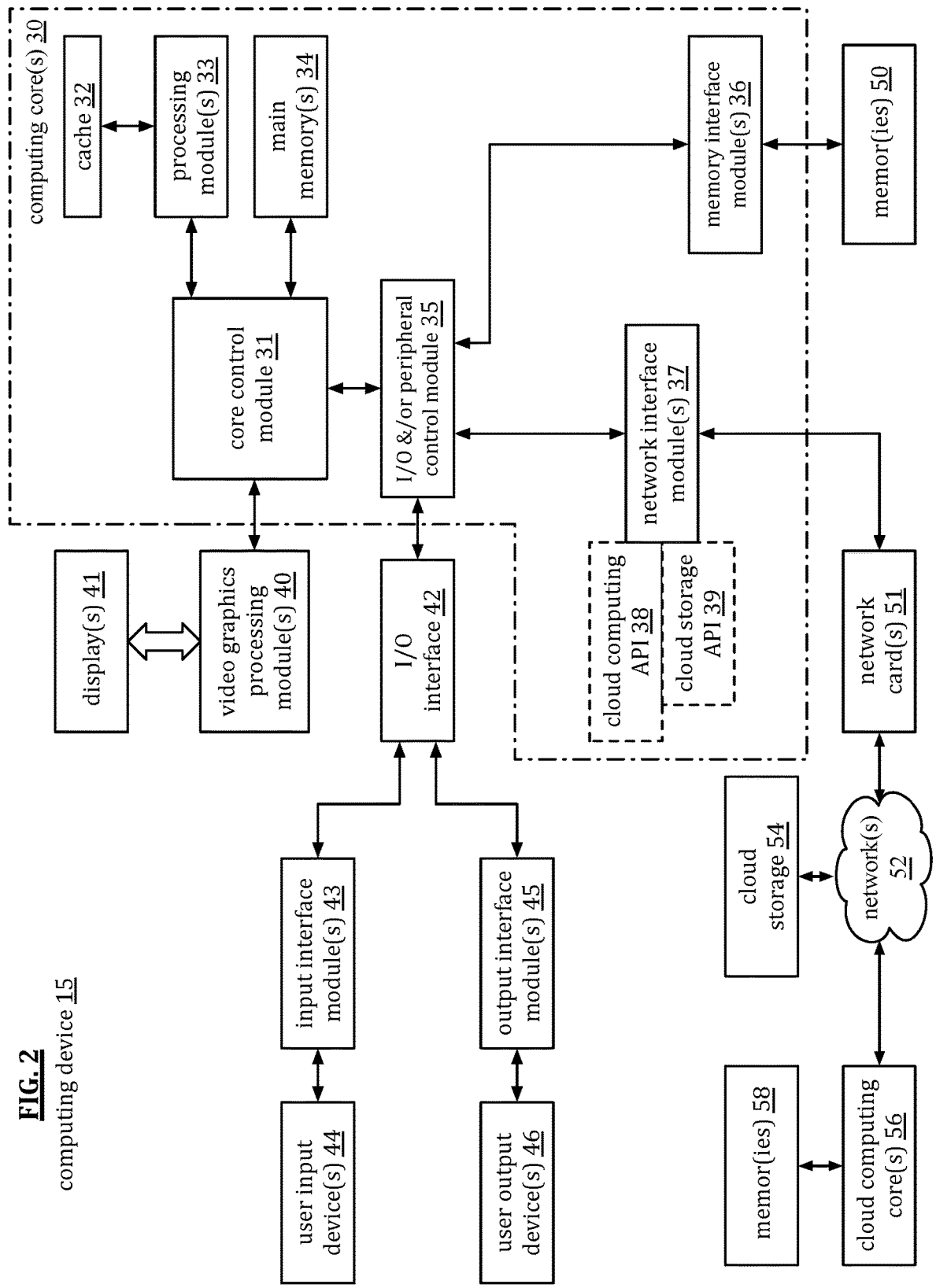
FIG. 2 is a schematic block diagram of an embodiment of a computing device in accordance with the present invention.

FIG. 2 is a schematic block diagram of an embodiment of a computing device 15 that includes computing core(s) 30, video graphics processing module(s) 40, display(s) 41, an input/output (I/O) interface 42, input interface modules(s) 43, user input device(s) 44, output interface module(s) 45, user output device(s) 46, memor(ies) 50 and network card(s) 51. A computing core 30 includes a core control module 31, a cache 32, processing module(s) 33, main memory(s) 34, I/O &/or peripheral control module 35, memory interface module(s) 36, network interface module(s) 37, and may also include a cloud computing application programming interface (API) 38 and a cloud storage API 39.

An optional extension of the computing device includes cloud storage 54, cloud computing core(s) 56, and/or memories 58 operably coupled to network(s) 52. In an example, the optional extension is a tenant in Amazon® Web Services (AWS) Simple Storage Service (S3). In another example, the optional extension works in concert with the computing core 30. In yet another example, the computing core 30 is a conduit to the cloud storage 54, cloud computing 56 and/or memories 58.

Note that a computing device 15 may be a portable computing device and/or a fixed computing device. A portable computing device may be a virtual reality device, an augmented reality device, a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment.

Figure 3A:
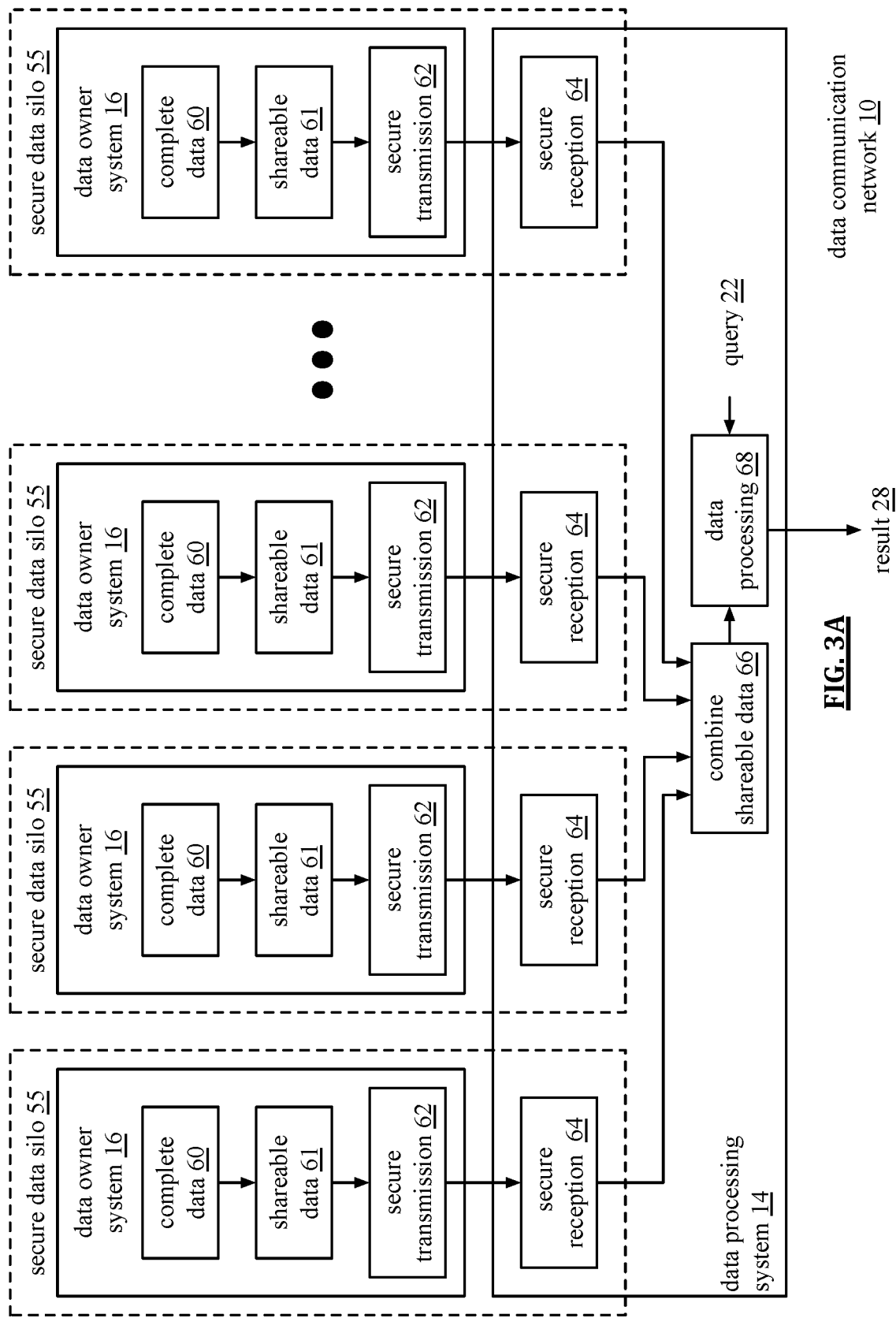
FIG. 3A is a diagram of an embodiment of a data processing system processing a query using secure data silos in accordance with the present invention.

FIG. 3A is a diagram of an example of a secure data flow within the data communication network 10. In an example, to maintain security of a data owner's data, the data owner system 16 communicates with the data processing system 14 via a secure data silo 55. Each data owner system 16 stores complete data 60, which includes a plurality of records and each record includes a plurality of data fields. Some of the data fields includes data that cannot be shared by law, should not be shared in accordance with an agreement between the data owners and another entity (e.g., object of data, data consumer, another data source, etc.) and/or should not be shared in accordance with a data owner's own data privacy policy.

Within the secure data silo 55, selected complete data (e.g., some or all of it based on a query) may be modified (e.g., altered, normalized and/or anonymized) to produce shareable data 61. The selected complete data is anonymized by removing, obscuring, and/or altering data in data fields of the records that contain information that should be kept private (e.g., in accordance with the data owner's privacy policy). The anonymized data may then be normalized to a desired format (e.g., data field orientation to line up columns of data, specific field formatting so data in columns is presented in the same manner, etc.). This is all done within the control of the data owner system 16.

Via a secure data transmission 62 and a secure data reception process 64 (e.g., encryption, virtual private network (VPN), transmission control protocol/internet protocol (TCP/IP) with secure sockets layer (SSL) encryption, a public key infrastructure (PKI), a secure communication link, etc.), the shareable data 61 is received by the data processing system 14. This is done within the secure data silo 55 as well.

In this manner, each secure data silo 55 operates independently from the other secure data silos 55 insuring that each data owner system's complete data 60 is securely maintained within its data silo and is prevented from being accessed by the other data owner systems 16 and/or by any entity outside of the data owner system 16. The secure data silos 55 also isolates a data owner system's shareable data 61 from other data owners and from data consumers.

The data processing system 14 combines the shareable data 61 from the various data owner systems to produce combine shareable data 66. The data processing system 14 performs data processing 68 on the combined shareable data 66 based on a query 22 to produce a result 28. Alternatively, the data processing system 14 may perform data processing on shareable data 61 from one or more data owner's and the combine Once the data result 28 is sent to a data consumer, the combined shareable data 66 and the shareable data 61 from each data owner system is deleted.

Thus, via the data processing system 14, data from a variety of data owner systems can be used by a variety of different data consumers in response to a variety of queries without compromising privacy requirements of the data. This is achieved because the complete data (i.e., the data including privacy information) never leaves the control of the data owner system 16. Further, only the data processing system has access to the shareable data 61 from the data owner systems. With this controlled access, data consumers obtain analysis of a broad spectrum of data without having access to any of the complete data and/or any data that is not shareable data; thus privacy of the data is not compromised.

Figure 3B:
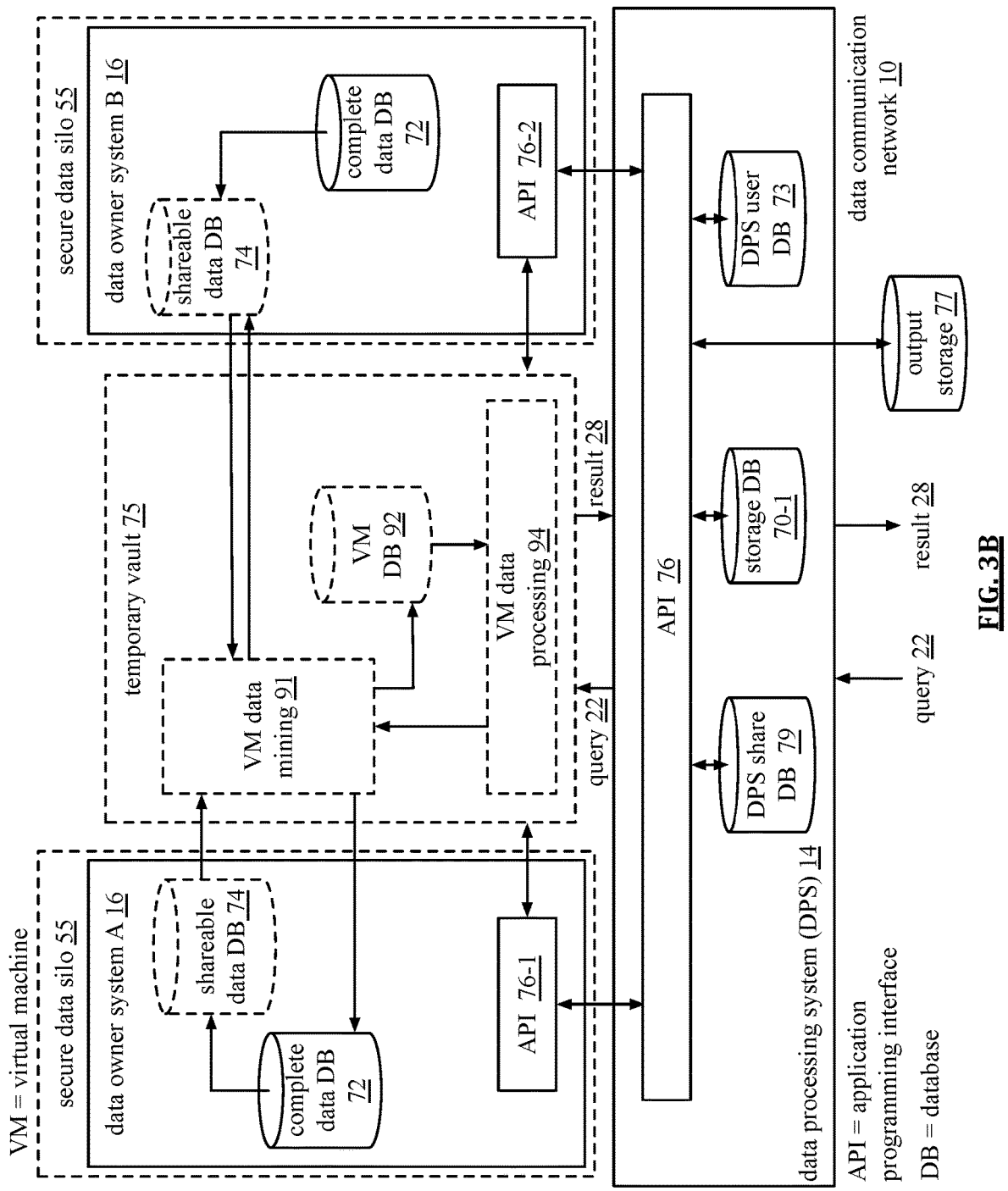
FIG. 3B is a schematic block diagram of an embodiment of a data communication network in accordance with the present invention.

FIG. 3B is a schematic block diagram of an embodiment of creating secure data silos 55 and a temporary vault 75 for processing a query 22 in a data communication network 10. The data communication network 10 includes a data processing system (DPS) 14, a plurality of data owner systems 16, an output storage 77, and a temporary vault (e.g., a virtual vault) 75. A data owner system 16 includes an application programming interface (API) 76, a complete data database (DB) 72 and a shareable data DB 74. The temporary vault includes one or more of a third party cloud network, a virtual private cloud (VPC), a virtual private network (VPN), a virtual machine (VM), and a container. In an example, the temporary vault is a VPN with gated outbound and inbound access.

The data processing system 14 includes an API 76, a DPS share DB 79, a storage DB 70-1 and a DPS user DB 73. The DPS share DB 79 includes information (e.g., identity, data sharing agreements, data sharing history, payment history, etc.) on data owners of a data communication network. The DPS user DB 73 includes information (identity, query history, payment history, etc.) on data consumers of a data communication network. The information of databases 70-1, 73, and 79 may also include one or more of registration information, a username, a password, and keys (e.g., cryptographic). In an example, the information is utilized in accordance with a temporary credential protocol to setup a temporary vault for processing of shareable data. In an example, the temporary credential protocol includes setting up access (e.g., providing credentials, providing login information, etc.) for use of one or more of a virtual private cloud (VPC), a virtual machine (VM) and a container to obtain and/or process the shareable data.

In another example, the temporary credential protocol includes establishing first temporary security credentials for the data processing system to create the virtual machine. After the virtual machine is created and in accordance with the first temporary security credentials, the temporary credential protocol further includes the data processing system establishing second temporary security credentials for the virtual machine to access the memory of a data owner system. In an instance, the temporary security credentials include an access key pair and a session token. The access key pair includes an access key identification and a secret key. In another instance, the temporary security credentials include a username and password.

As an example, the data processing system 14 sets up the temporary vault 75 to utilize in returning a result 28 in response to a query 22. In this example, the temporary vault 75 includes a virtual machine (VM) data mining 91, a VM DB 92, and a VM data processing 94. However, in other examples, the temporary vault includes one or more containers.

As an example of operation, upon receiving a query 22 from a data consumer computing entity, the data processing system sends requests to data owner systems to participate in providing shareable data for the query. Alternatively, or in addition to, the data processing system sends requests to data owner systems that have previously registered with the data processing system and/or have previously agreed to share data regarding the type of query received.

When the data owner systems wish to participate, the data processing system 14 and the participating data owner system 16 collaborate to create access to at least a portion of the complete data DB 72 and/or the shareable data DB 72 in the data owner system. The collaboration includes one or more of registering with the data processing system by the data owner, registering with the data owner system by the data processing system, exchanging temporary credentials, setting up permissions, creating a virtual private cloud (VPC), creating a virtual private network, creating a container (e.g., lightweight scalable application with associated environment variable, configuration files, libraries and/or software dependencies), and creating a temporary vault.

In a specific example, the temporary vault includes one or more of a container management entity (e.g., Kubernetes cluster, data processing system's application programming interface (API)) to manage a VPC's containers, memory (e.g., an output bucket, random access memory (RAM), VM DB 92, etc.), one or more proxies to gate and log access to files and/or APIs within the temporary vault, and a VPC. The proxies are discussed in further detail with reference to one or more subsequent figures.

The VM data mining 91 searches the complete data DB 72 for data records based on the query 22. The VM data mining stores data records found in the search in the shareable data database (DB) 74 in the data owner system 16. The VM data mining 74 may also modify (e.g., normalize, anonymize according the a regulation (e.g., HIPAA), privatize according to an agreement, etc.) the sets of data records.

Alternatively, or in addition to, the VM data mining 91 searches (e.g., based on a command from API 76 (e.g., API 76, 76-1, 76-2)) shareable data DB 74 for data records based on the query 22 and stores the data records found in the search in the VM DB 92 of the temporary vault. This may be done for a variety of reasons. For example, when a data owner system only allows access to shareable data DB, when a data owner system has already stored shareable data in shareable data DB, and/or when a request indicates to search both complete data DB and shareable data DB to fulfill the query. In one example, the shareable data database (DB) 74 is a temporary vault or container. The VM data mining 91 is further operable to retrieve the data records stored in each shareable data DB 74 and store them (e.g., as combined shareable data, as individual shareable data) in the VM DB 92 within the temporary vault 75.

In an example, the VM data mining 91 is allowed access (e.g., via a virtual private cloud (VPC), in accordance with security credentials, etc.) to a portion of the complete data DB 72 storage location (e.g., physical addresses, logical addresses). Note the shareable data DB 74 may be a portion of the complete data DB (e.g., within a same storage location) or may be in a separate storage location within the control of the data owner system. Further note the shareable data DB includes one or more of volatile memory (random access memory (RAM), a register, etc.) and non-volatile (NV) memory (e.g., NVRAM, flash memory, read only memory, a disk drive, etc.).

As a specific example, VM data mining 91 accesses complete data DB 72 of data owner system A 16 to search for data records based on the query 22 and/or accesses shareable data DB 74 of data owner system B 16 to search for data records based on the query. In an instance, the VM data mining 91 cannot access complete data DB 72 of data owner system B 16. Thus, only shareable data DB 74 of data owner system B 16 can be accessed by VM data mining 91, which improves security. Further, one or both of the complete data DB 72 and the shareable data DB 74 only allow read-only access in accordance with the temporary credential protocol, which maintains integrity of the data.

In another instance, data owner system A 16 restricts certain data fields of a data record (e.g., data fields that include non-shareable data) from being stored in the shareable data DB 74, thus maintaining security of the data. Thus, only data from shareable data DB may be sent to VM DB 92 of the temporary vault 75. In yet another instance, the VM data mining sends a query request to the data owner system, and receives a query response that includes data records of shareable data, thus the elements within temporary vault 75 do not have access within data owner controlled secured data storage and computing 70.

The VM data processing 94 processes (e.g., executes one or more functions based on the query) the combined shareable data to produce a result 28. As an example, executable code in the form of a container associated with a data consumer is executed on the combined shareable data to produce the result. Having produced the result 28, it is sent to the data processing system 14, which may store the result 28 in an internal (e.g., only data processing system has access to) storage DB 70-1 and/or an external (e.g., third party storage) output storage 77. Alternatively, or in addition to, the result 28 is sent directly to output storage 77. Note output storage may be temporary storage that is deleted after a certain period of time (e.g., 30 min, 2 days, etc.) and/or in accordance with an agreement (e.g., after it is accessed by a data consumer computing entity).

As such, via the secure data silos 55 and the temporary vault 75, data from a variety of data owner systems can be used by a variety of different data consumers in response to a variety of queries without compromising privacy requirements of the data. This is achieved because the non-shareable data (e.g., data including privacy information) never leaves the data owner system 16. Further, in an embodiment, only the temporary vault has access to the shareable data from the data owner systems. With this controlled access, data consumers obtain analysis of a broad spectrum of data without having access to any of the complete data; thus privacy of the data is not compromised, while ability to perform queries on a vast amount of data is greatly improved.

Figure 3C:
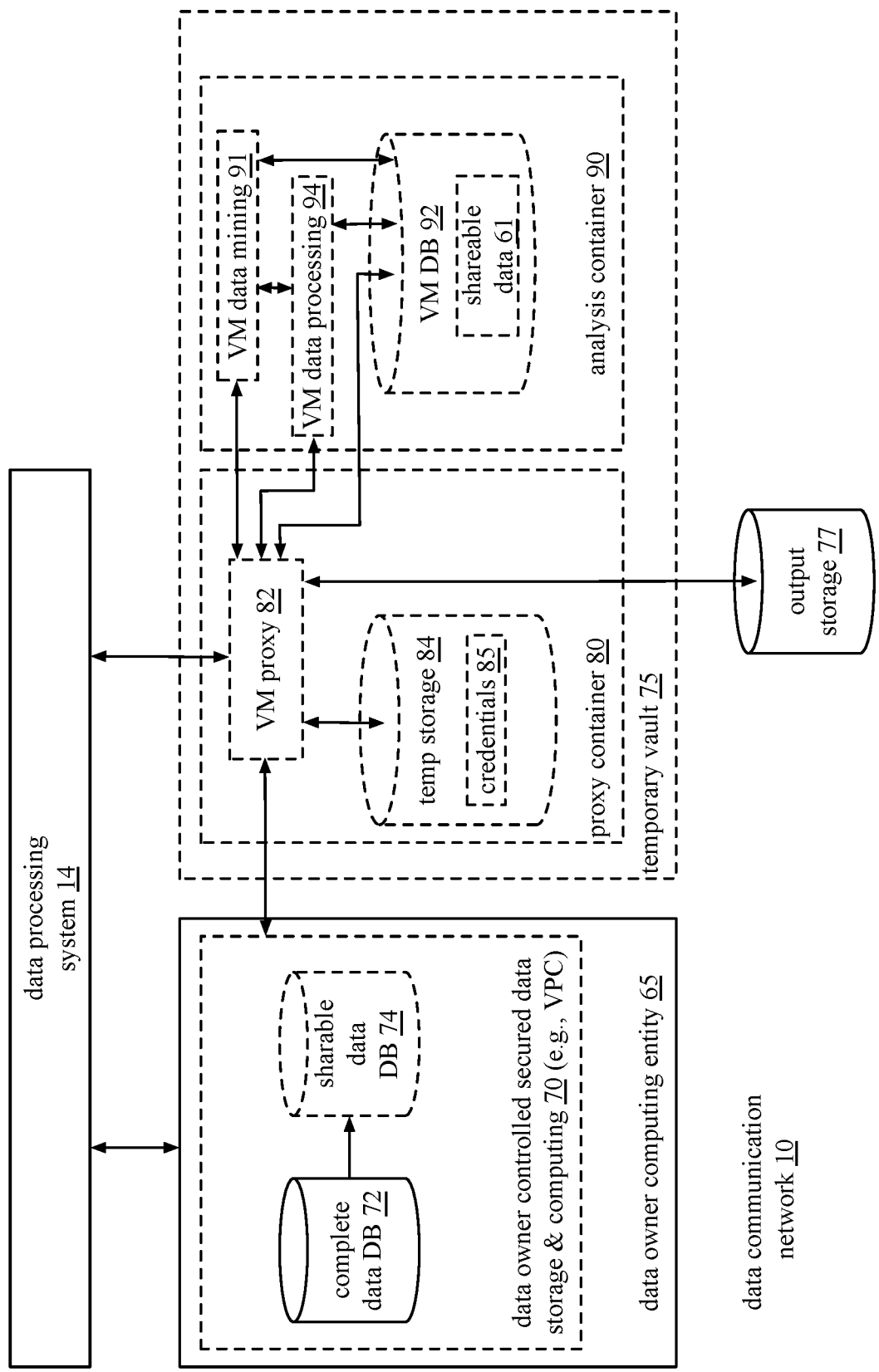
FIG. 3C is a schematic block diagram of another embodiment of a data communication network in accordance with the present invention.

FIG. 3C is a schematic block diagram of an embodiment of a data communication network 10 that includes a data processing system 14, a data owner computing entity 65, an output storage 77 and a temporary vault 75. The data owner computing entity 65 includes a data owner controlled secured data storage and computing 70, which includes a complete data database (DB) 72 and a shareable data DB 74. The temporary vault 75 includes a proxy container 80 and an analysis container 90.

The proxy container 80 includes a proxy 82 and a temporary storage 84 that stores credentials 85. In an embodiment, the proxy acts an intermediary for requests and/or response, from elements within the analysis container, the data owner computing entity and/or the data processing system. For example, the proxy 82 receives a request from VM data mining 91 to access shareable data from the data owner computing entity 65. In another embodiment, the proxy further adds functionality to or restricts access between the elements of data communication network 10 based on a set of rules (e.g., agreements, access control lists, etc.). This will be discussed in greater detail with reference to one or more subsequent Figures.

In an embodiment, the temporary storage 84 includes one or more of a register, a cache, random access memory (RAM) (e.g., static RAM, dynamic RAM), and other volatile memory. In another embodiment, the temporary storage includes volatile memory and non-volatile (NV) memory (e.g., NVRAM, flash memory, read only memory, a disk drive, etc.). The analysis container 90 includes a virtual machine (VM) data mining 91, a VM DB 92 that stores shareable data 61 and a VM data processing 94.

The data owner controlled secured data storage and computing 70 may be implemented by one or more of a virtual private cloud (VPC) and a virtual private network (VPN). Note the proxy is the only conduit for any element of the analysis container (e.g., VM data mining 91, VM data processing 94, etc.) from requesting data from the data owner computing entity. Further, the proxy does not allow access to or share information regarding credentials associated with the data owner computing entity 65. This improves security of the credentials while processing a query as the elements of the analysis container cannot gain access to, and thus output any information regarding credentials associated with the data owner computing entities.

In an example of operation, the data processing system creates a temporary vault 75 in accordance with a temporary credential protocol between the data processing system 14 and the data owner computing entity 65. The data processing system 14 obtains credentials 85 for the data owner computing entity and sends the credentials to the proxy 82 for storage in temporary storage 84 of the proxy container 80. The credentials includes one or more of a token, a public/private keypair, multi-factor authentication, a username and a password, and an access key identifier and secret access key. A credential is one of a temporary credential (e.g., expires after use, expires after a timeframe, etc.) and a non-temporary credential (e.g., does not expire unless revoked by owner, etc.). In an example, the data processing system creates the credentials. In another example, the data processing system obtains the credentials from another entity (e.g., the data owner system).

The VM data mining 91 functions to retrieve data for a query by sending a request for data of data owner computing entity 65 to proxy. In an instance, the proxy 82 functions to determine, based on credentials 85, whether the request is valid. For example, when the credentials 85 stored in temporary storage 84 include a valid data access credential for the requested data owner computing entity 65 associated with the request, the proxy determines the request is valid. As another example, when the request is received from the analysis container, the proxy determines the request is valid.

When determining the request is valid, the proxy creates a data retrieval request based on the request and the data access credential associated with the data owner computing entity. For example, the proxy forwards the request along with the associated data access credentials to the data owner computing entity. The proxy receives, from the data owner computing entity 65, a data response and forwards the data response to the analysis container (e.g., to the VM data mining 91, the VM data processing 94 and/or the VM DB 92). As an example, the data response includes shareable data and the proxy forwards the shareable data to the analysis container (e.g., the VM data processing 94).

The VM data processing 94 executes one or more functions on the shareable data to produce a result. In an example, the result is received by the proxy 82 (e.g., from VM data mining 91, from VM data processing 94) and the proxy 82 forwards the result to one or more of the data processing system 14, the data owner computing entity 65, output storage 77 and a data consumer computing entity (e.g., associated with the query).

Figure 3D:
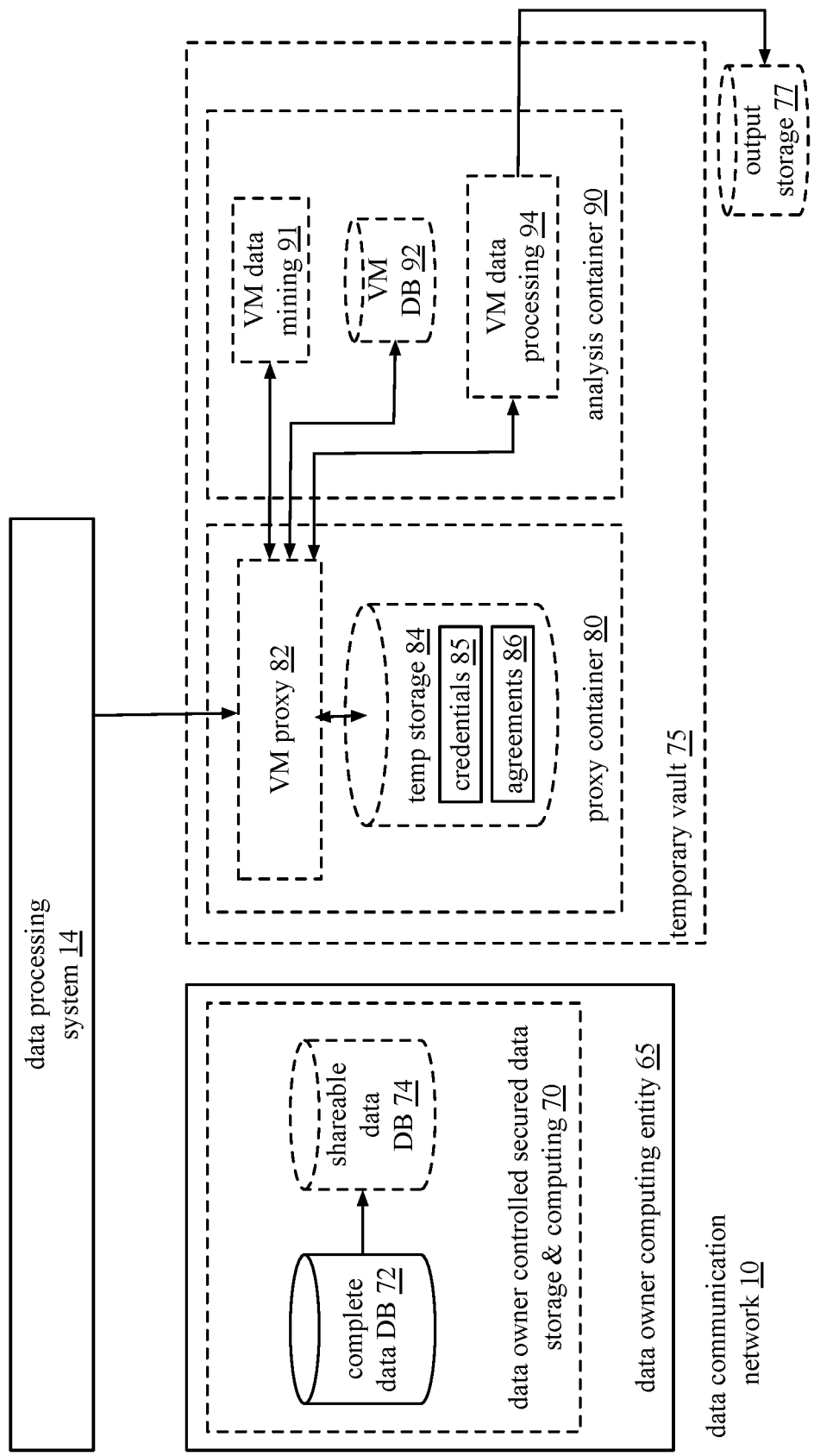
FIG. 3D is a schematic block diagram of an another embodiment of a data communication network in accordance with the present invention.

FIG. 3D is a schematic block diagram of an embodiment of data communication network 10 that includes a data processing system 14, a data owner computing entity 65, an output storage 77 and a temporary vault 75. The data owner controlled secured data storage and computing 70 includes a complete data database (DB) 72, and a shareable data DB 74. The temporary vault 75 includes a proxy container 80 and an analysis container 90. The analysis container 90 includes a virtual machine (VM) data mining 91, a VM DB 92, and a VM data processing 94.

The proxy container 80 includes a VM proxy 82 and a temporary storage 84 that stores credentials 85 and agreements 86. Note in an example, the agreements are also stored in DPS share DB 79 of FIG. 3B. The agreements include one or more of endpoint access parameters, time based parameters, call type parameters, data size parameters, port assignment parameters, MIME data type parameters, and header key/value sets parameters. In an example, an agreement is between one or more of the data processing system, one or more data owner systems, one or more publicly available data computing devices and one or more data consumer computing entities. For example, the agreement is between a first data owner system (e.g., one or more data owner computing entities) and a first data consumer computing device. As another example, a data owner computing entity has a first agreement with the data processing system, has a second agreement with a first consumer computing entity, and has a third agreement with the first data consumer computing entity, a second data consumer computing entity, and a second data owner computing entity.

As a first example of an agreement, the agreement includes parameters that indicate to allow usage of an endpoint. As a second example, an agreement includes parameters that indicate to restrict usage of an endpoint. As a third example, an agreement includes parameters that indicate to allow access to a first data owner computing entity's shareable data between the hours of 1800 and 2300 eastern standard time. As a fourth example, an agreement includes parameters that indicate to allow one or more particular call types (e.g., GET, PUT, POST, etc.).

As a fifth example, an agreement includes parameters that indicate to limit data size of outputs to 5 GB for a request and/or for a session. As a sixth example, an agreement includes parameters that indicate to allow access to a first port (e.g., port 443) but not a second port (e.g., port 80). As a seventh example, an agreement includes parameters that indicate to allow Multi-Purpose Internet Mail Extension (MIME) data types that are in a JavaScript Object Notation (JSON) format. As an eighth example, an agreement includes parameters that indicate to block a first header key/value set.

As a ninth example, an agreement includes parameters that indicate a first data consumer computing entity may perform GET requests from a first data owner computing entity between 1800 and 2300 EST via port 443 that do not include a first header key/value set. As a tenth example, an agreement includes parameters that indicate to allow data requests to a first endpoint, a second endpoint and a third endpoint with a limit of 5 TB of cumulative data returned.

In an example of operation, the VM proxy 82 receives a data access request from VM data mining 91, requesting shareable data for a query regarding a study on the number of reported cases of a human coronavirus in area A in the last 7 days. The VM proxy determines based on the credentials, agreements and/or the location of the request whether the request is valid. For example, the VM proxy retrieves agreement 86 and determines whether an agreement exists that allows for this particular request. As another example, the VM proxy determines the request is valid when received from the analysis container.

As another example, the VM proxy retrieves agreement 86 and determines whether an agreement exists that prohibits this particular request. For example, when an agreement prohibits the call type (e.g., POST) of the data request, the VM proxy denies the request. In an example, when the VM proxy denies the request, the VM proxy may further determine whether the prohibited action violates the agreement and/or a second agreement between the data processing system and a data consumer computing entity associated with the analysis container.

In an example, when the prohibited action violates the second agreement, the VM proxy implements a vault teardown procedure that includes deleting the temporary vault and its contents. For example, the VM proxy sends a termination request to the data processing system regarding the prohibited action. When the data processing system determines that the prohibited action violates an agreement and/or is over a prohibited action threshold (e.g., $3^{rd}$ prohibited action where prohibited action threshold=2), the data processing system initiates the teardown procedure.

In an instance, an agreement between the data processing system and the data consumer computing entity includes a fee charged when an amount of prohibited actions exceed a prohibited action threshold. As another instance, when an amount of prohibited actions exceed a prohibited action threshold, the amount of resources (e.g., bandwidth, storage space, processing capabilities, etc.) utilized by the analysis container is reduced and/or restricted for a period of time and/or an amount of data.

When the determination is favorable (e.g., no agreement prohibits this particular request, an agreement allows this particular request, request is from the analysis container, etc.), the VM proxy 82 determines the data access request is valid. In an example, the VM proxy, for the determining whether the request is valid, also determines whether first credentials stored in temporary storage 84 are associated with a first data owner computing entity or system that has data regarding the data access request. When the VM proxy 82 determines the credentials are stored, the VM proxy determines the data access request is valid in accordance with the credentials. Alternatively, when the temporary storage does not include the first credentials, the VM proxy may send a request to the data processing system and/or the data owner computing entity requesting the first credentials. When the VM proxy receives favorable credentials (e.g., the requested first credentials), the VM proxy determines the request is valid.

When VM proxy 82 determines the data access request is valid, the VM proxy 82 sends the request to the data owner computing entity. For example, the VM proxy 82 appends the credentials to the data access request to produce a data access request package, and sends the data access request package to the data owner computing entity 65.

Figure 3E:
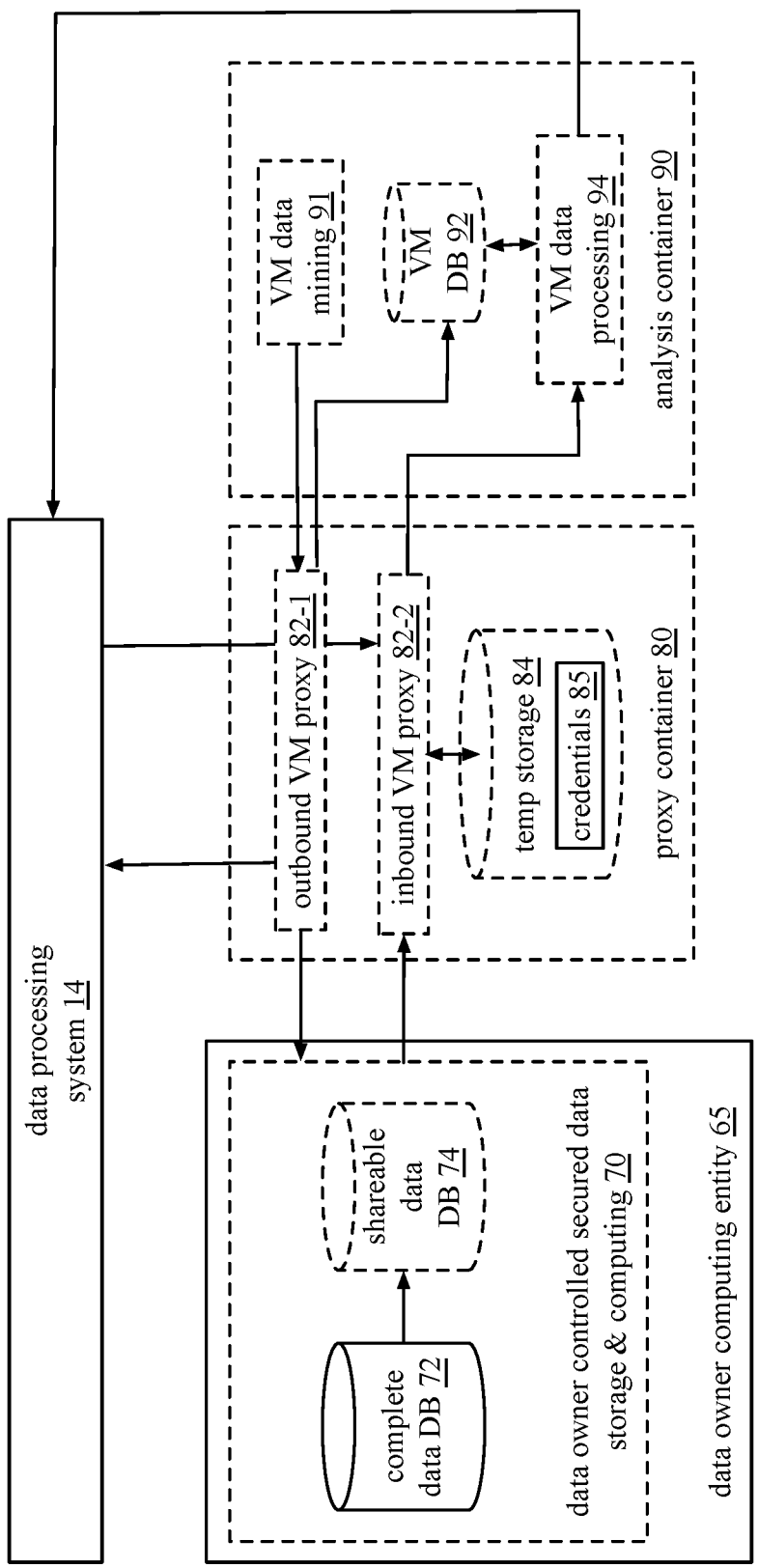
FIG. 3E is a schematic block diagram of another embodiment of a data communication network in accordance with the present invention.

FIG. 3E is a schematic block diagram of an embodiment of data communication network 10 that includes a data processing system 14, a data owner computing entity 65, a proxy container 80 and an analysis container 90. This example is similar to FIG. 3C, except that data mining 91 does not have direct access to the VM DB 92, the proxy is implemented by an outbound proxy 82-1 and an inbound proxy 82-2, and the VM data processing 94 sends results to data processing system 14 instead of an output storage.

Figure 3F:
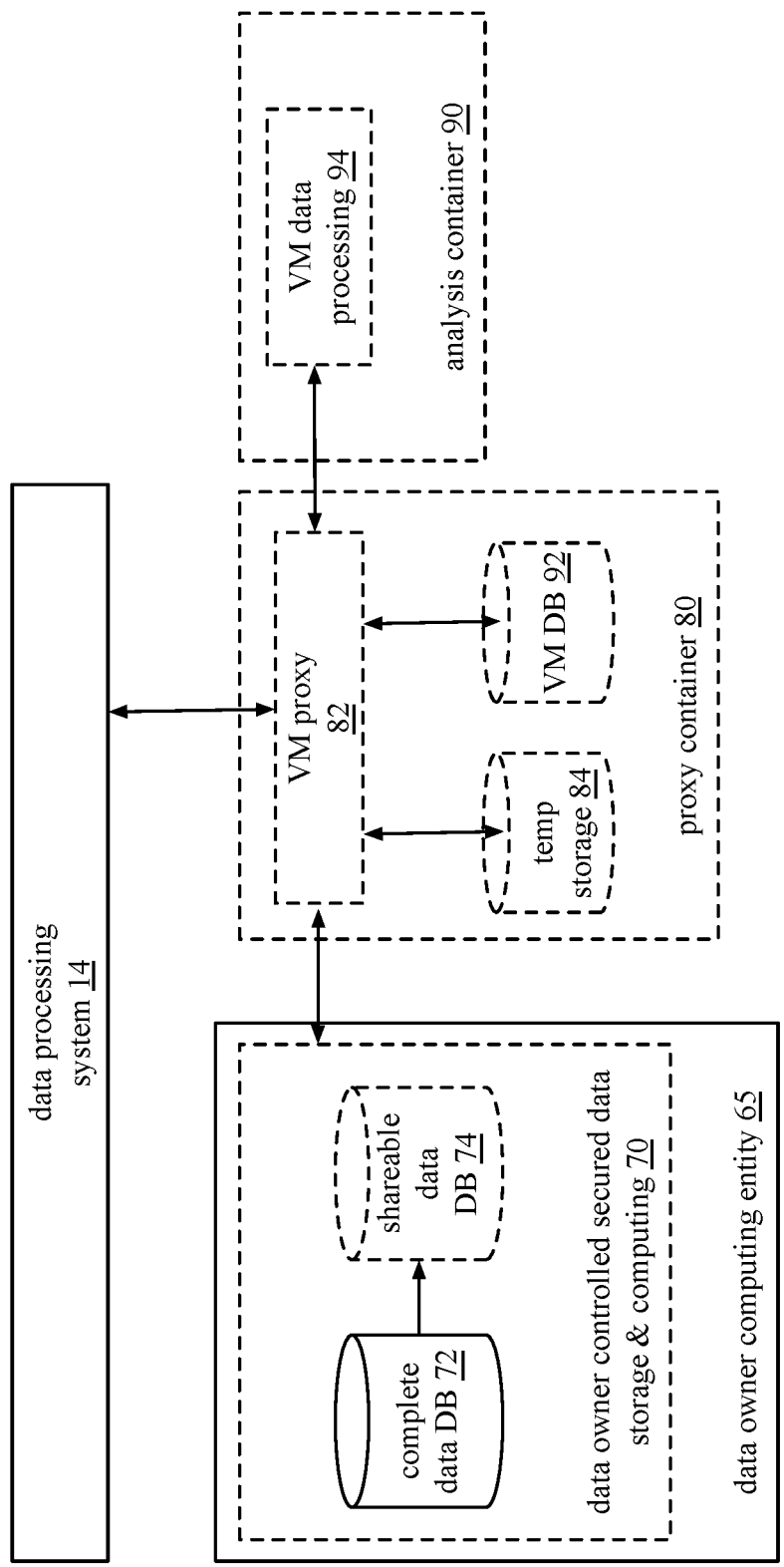
FIG. 3F is a schematic block diagram of another embodiment of a data communication network in accordance with the present invention.

FIG. 3F is a schematic block diagram of an embodiment of data communication network 10 that includes a data processing system 14, a data owner computing entity 65, a proxy container 80, and an analysis container 90. The data owner controlled secured data storage and computing 70 includes a complete data database (DB) 72, and a shareable data DB 74. The proxy container 80 includes a virtual machine (VM) proxy 82, a temporary storage 84 and a virtual machine (VM) database (DB) 92. The analysis container 90 includes a VM data processing 94. In an example, the VM data processing 94 includes the functionality of a VM data mining module.

Figure 3G:
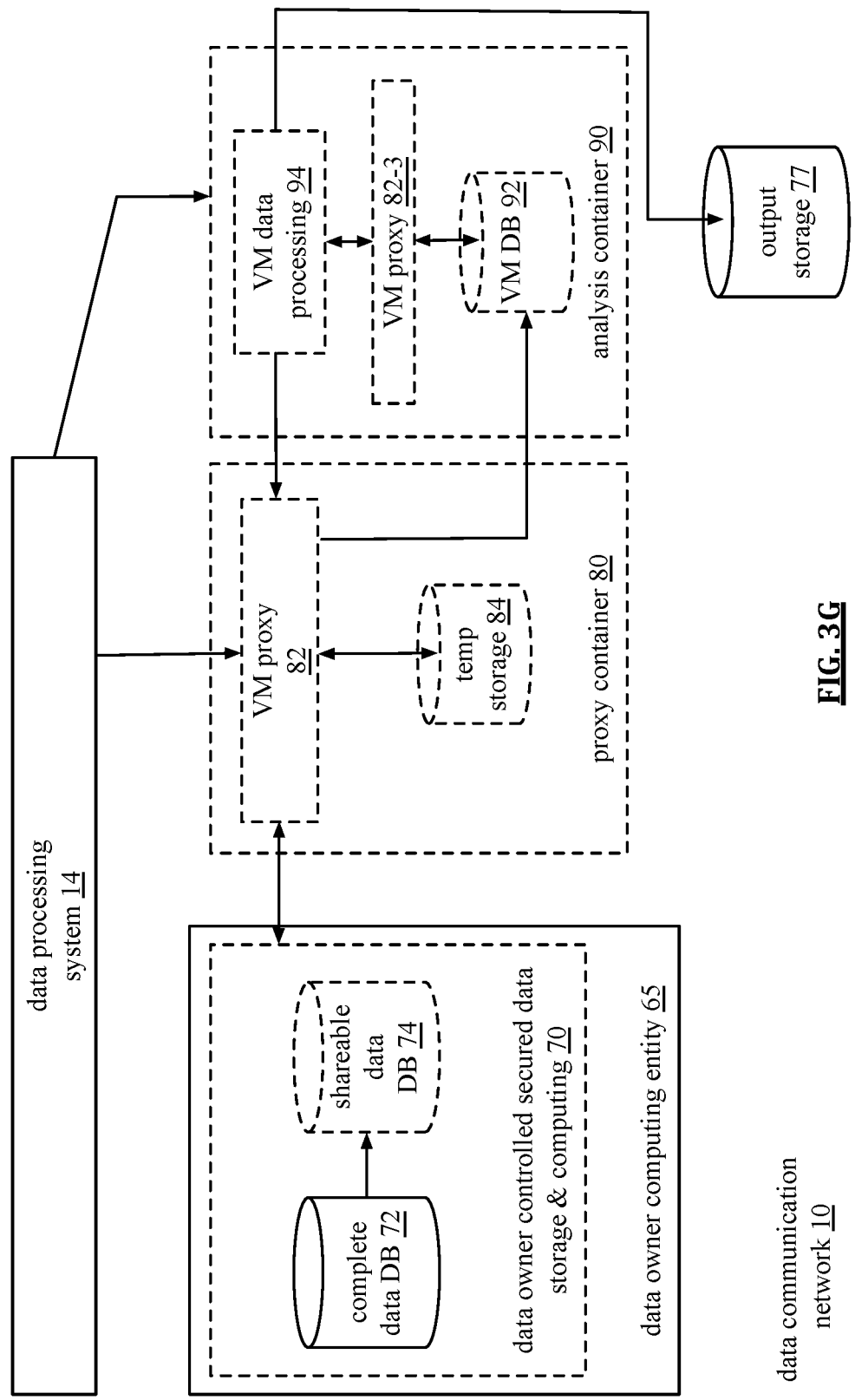
FIG. 3G is a schematic block diagram of another embodiment of a data communication network in accordance with the present invention.

FIG. 3G is a schematic block diagram of an embodiment of data communication network 10 that includes a data processing system 14, a data owner computing entity 65, an output storage 77, a proxy container 80 and an analysis container 90. The data owner controlled secured data storage and computing 70 includes a complete data database (DB) 72, and a shareable data DB 74. The proxy container 80 includes a proxy 82 and a temporary storage 84. The analysis container 90 includes a virtual machine (VM) processing 94, a VM proxy 82-3 and a VM DB 92.

In an example, of operation, the data processing system 14 communicates with the VM proxy and the analysis container. For example, the data processing system sends, to the VM proxy or to temporary storage 84, credentials associated with data owner computing entities that may be used for valid requests and/or to validate requests from VMs of the analysis container. As an example, the VM proxy receives a valid request and sends the valid request and credentials associated with a data owner computing entity associated with the valid request to the data owner computing entity.

In an embodiment, the data processing system provides settings for VM proxy 82-3 (e.g., port configuration, internet protocol (IP) address restrictions, logging requirements, etc.) of the analysis container and/or the VM proxy 82 of the proxy container. As such, the VM data processing 94 cannot access other elements in the analysis container (e.g., the VM DB 92) without utilizing VM proxy 82-3 and cannot send requests for data from the data owner computing entity without utilizing VM proxy 82. Further, the VM data processing is restricted from accessing temporary storage 84. Thus, the VM data processing does not have access to, or gain knowledge of any credentials of the data owner computing entity. Further, this ensures that actions associated with agreements are monitored and/or enforced, which improves the security and reliability of processing queries.

Figure 3H:
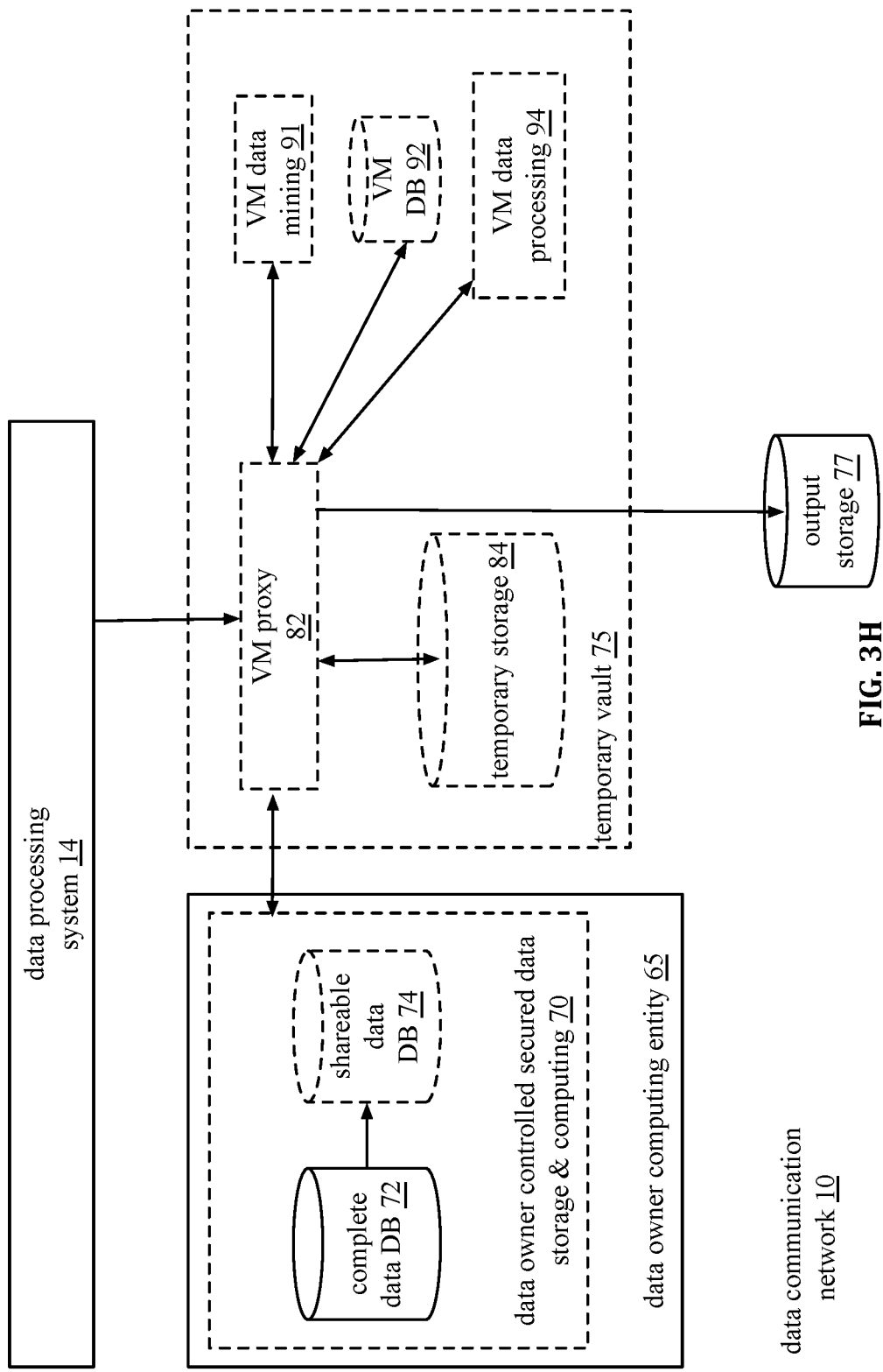
FIG. 3H is a schematic block diagram of another embodiment of a data communication network in accordance with the present invention.

FIG. 3H is a schematic block diagram of an embodiment of data communication network 10 that includes a data processing system 14, a data owner computing entity 65, an output storage 77 and a temporary vault 75. This is similar to the example of FIG. 3C, except the temporary vault does not include a proxy container and an analysis container, and each of the VM data mining 91, the VM DB 92, and the VM data processing 94 can only access each other via VM proxy 82. For example, the VM data processing sends a result to a query to output storage 77 via the VM proxy 82. Note that output storage may be temporary (e.g., deleted within a first time threshold after the result is stored, destroyed if power is lost, may be overwritten with other data when a credential expires, etc.).

In another embodiment, the data processing system creates audit logs based on the processing the query. In an example, the audit logs are stored for a particular period of time. The storage may be via the data processing system or stored in a third party storage system. In another example, the audit logs are sent to one or more of the data consumer computing entity and the data owner system. Further, the analytical result may be stored for future retrieval and/or use by one or more of the data consumer computing entity, the data processing system and the data owner system.

FIGS. 4A-4C are schematic block diagrams of an example of setting up shareable data access in a data communication network 10. FIG. 4A illustrates a data processing system 14, and a plurality of data owner computing entities 65 of the data communication network 10. A data owner computing entity 65 includes a complete data database (DB) 72 in a data owner controlled secured data storage & computing 70. In an embodiment, the data owner controlled secured data storage & computing 70 is implemented by a virtual private cloud (VPC) and/or a virtual private network (VPN).

In this example, a data owner registers (1*a*-1*b*) with the data processing system 14. When approved, the data processing system obtains (e.g., generates, receives, etc.) at step 2*a*-2*b*, a login and key for the data owner computing entity. For example, the data owner is given a login for the data processing system and is granted a key that identifies an application programming interface (API) of the data owner system to the data processing system.

FIG. 4B illustrates in step 3*a*-3*b*, the data processing system providing registration information (e.g., the login and key) to each approved data owner system. In step 4*a*-4*b*, the data owner spins up a data processing system (e.g., via an API, in conjunction with a virtual machine (VM), etc.) in their own data owner cluster. In one example, the data processing system is brought up in a public cloud. The data owner cluster may contain an application programming interface (API), a user interface (UI), and one or more databases to store information.

FIG. 4C illustrates a data owner identifying and/or uploading shareable data. For example, the data owner provides information to the data processing system on data records in their complete data DB that they wish to share. The information may include, but is not limited to, a number of data records, credentials for accessing data records, and identities of users with which the data owner determines to share the data records. As another example, the data owner uploads data records via the API/UI to a bucket that is created for storing the data records. Note the bucket may be located in the data owner computing entity, the data processing system and/or a third party storage system. In an example, the data owner stores data records it wishes to share in shareable data DB and provides credentials for access to shareable data DB to the data processing system 14.

The example continues with steps 5c-5d, where the data processing system analyzes the data records (e.g., files) and stores the data records into a shareable data database (DB) 74. The data processing system may further store metadata from the analyzation of the data records internally and/or in the shareable data DB. In an example, an extract, transform, and load (ETL) process is triggered that analyzes data records stored in the complete data DB looking for new data records and/or changed data records and/or stores one or more data records in the shareable data database 74.

FIGS. 5A-5J are schematic block diagrams of an embodiment of securely processing a data access request. FIG. 5A illustrates the data processing system receiving (1) a data processing request from a data consumer computing entity. For example, the data processing request is a query for a number of patients exhibiting symptoms A, B & C that traveled to area A between date 1 and date 2. The data processing system then queries (2a-2b) the data owner computing entities 65 to determine an amount of data records available for use in processing the data processing request. Alternatively, or in addition to, the data processing system utilizes the metadata associated with shareable data identified previously (e.g., as discussed with reference to FIGS. 4A-4C) to determine the amount of data records available for use.

Figure 5B:
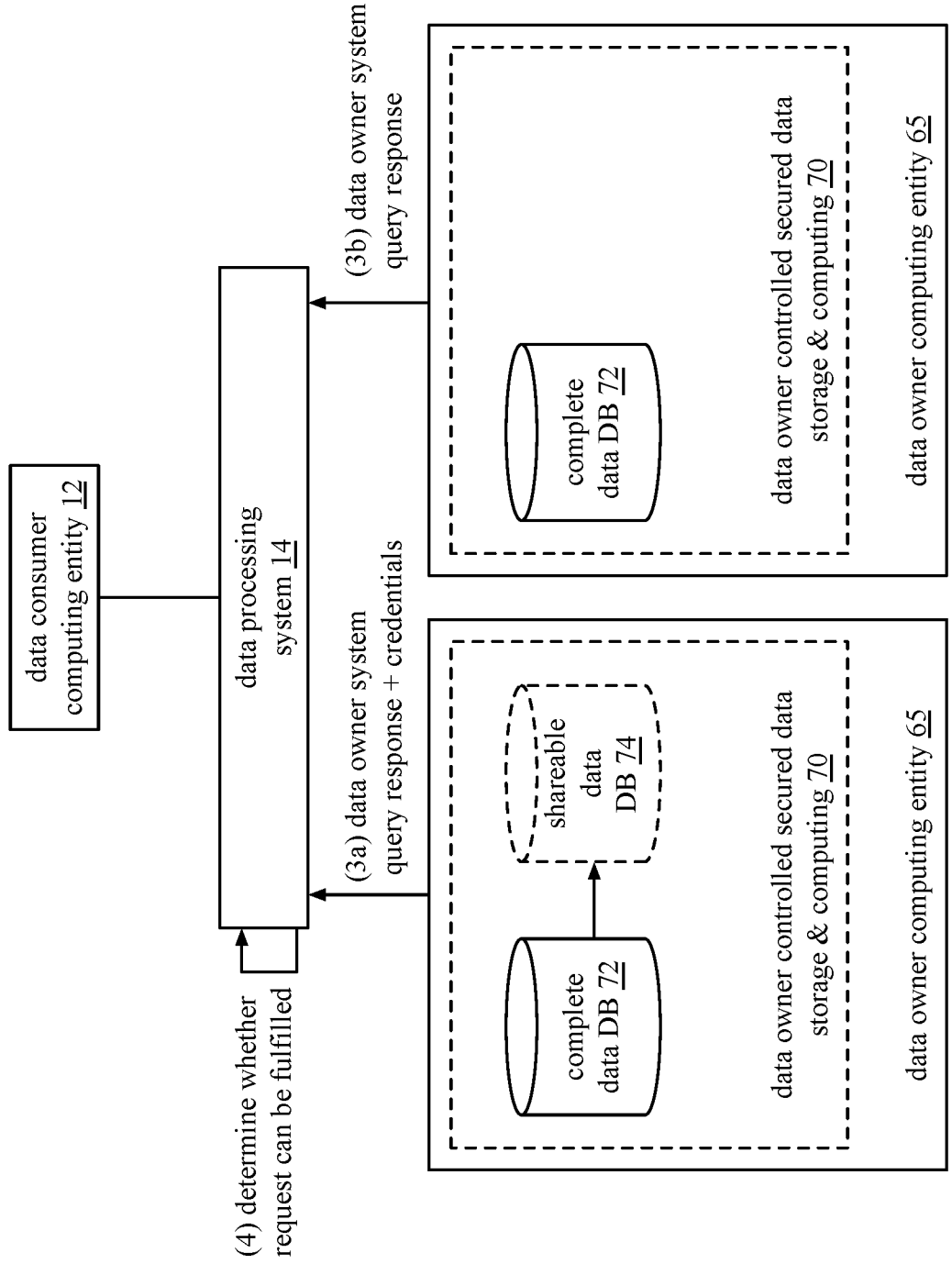

FIG. 5B illustrates the data owner systems responding (3a-3b) to the query. For example, each data owner computing entity responds with a number of data records that correspond with the query and whether they will participate in the query. For example, data owner system response in step 3a is a favorable response (e.g., indicates the data owner will participate, indicates the data owner has a threshold number of data records associated with the query) and the data owner system response in step 3b is an unfavorable response (e.g., indicates the data owner will not participate and/or does not have a threshold number of data records associated with the query). In an example, the data owner system query response (e.g., when favorable) includes credentials that allow access to at least a portion (e.g., complete data DB 72 and/or shareable data DB 74) of the data owner controlled secured data storage and computing 70 in accordance with a temporary credential protocol.

Having received the data owner system query response, the data processing system then determines (4) whether the data processing request can be fulfilled based on the responses from the data owner computing entities. For example, the data processing system determines whether there are enough shareable data records to meet criteria of the data processing request. As another example, the data processing system determines whether there is enough diversity in the types of data owners (e.g., specialization type, size (e.g., number of employees, number of locations, etc.) of data owner entity, type, trust level of data owner type, etc.) willing to share data to meet the criteria of the data processing request.

As a specific example, a data processing request includes a query of treatment outcomes of patients who take drug X and drug Y, from data owners with a trust level over a first trust threshold, and a minimum number of 1000 data records of patients for the query to have a minimum level of confidence (e.g., accuracy, correlation deviation, etc.). When the data processing system determines that there are 1000 or more data records regarding the query from data owners with the trust level, the data processing system determines the request can be fulfilled.

When the data processing system determines that there are not at least 1000 data records regarding the query from data owners with the trust level, the data processing system determines the request cannot be fulfilled. Alternatively, or in addition to, the data processing system may wait retry the querying the data owners. For example, when a query has 72 hours to be completed, the data processing system may try every 12 hours to see if more data records become available to fulfill the request. When the data processing system cannot fulfill the data processing request, the data processing system communicates with the data consumer computing entity that the request cannot be fulfilled with the current criteria.

The data processing system may further ask the data consumer computing entity whether criteria of request is able to be modified in order to fulfill the request. For example, the data processing system asks the data consumer computing entity whether to change the criteria to treatment outcomes of patients who take drug X, when the data processing system determines there are over 1000 data records related treatment outcomes of patients who take drug X, but under 100 data records related to treatment outcomes of patients who take drug Y. As another example, the data processing system asks the data consumer computing entity whether a change the criteria to trust level allows for data owners that have a trust level above a second threshold (e.g., where the second threshold is less than the first threshold), when the data processing system determines there are over 1000 data records related to treatment outcomes from data owners that have a trust level above the second threshold, but there are less than 1000 data records related to treatment outcomes from data owners that have a trust level only above the first threshold.

Figure 5C:
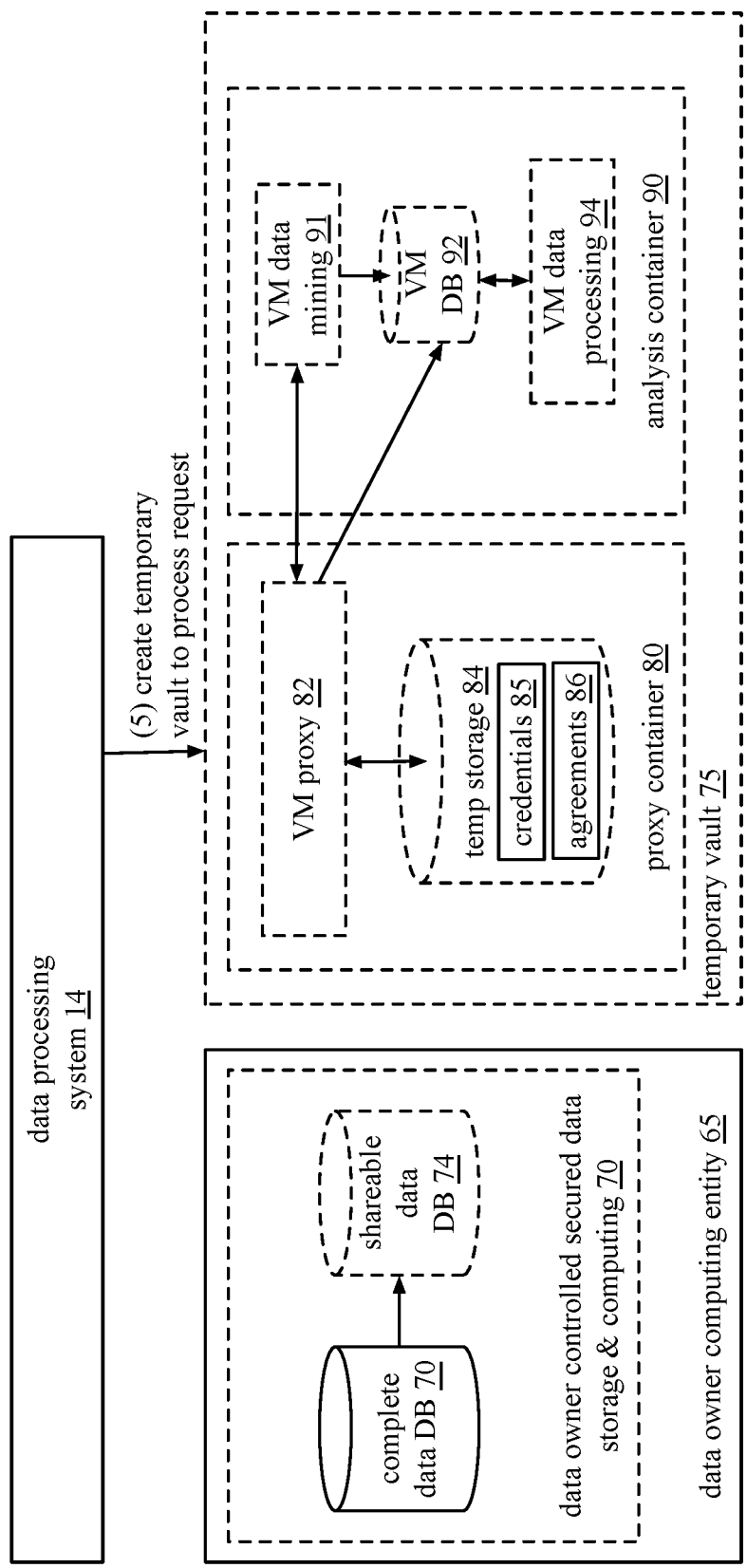

FIG. 5C illustrates the data processing system determining the data processing request can be fulfilled and creating a temporary vault 75. The temporary vault 75 includes one or more of a virtual private cloud (VPC), a virtual private network (VPN), one or more virtual machines, a Kubernetes cluster, an aggregate database (e.g., that may be populated with a cohort), an output bucket, temporary storage, and one or more containers.

In this example, the temporary vault 75 includes a proxy container 80 and an analysis container 90. The proxy container includes a virtual machine (VM) proxy 82, and a temporary storage 84 that includes one or more credentials 85 and agreements 86. The analysis container includes a VM data mining 91, a VM database (DB) 92, and a VM data processing 94. As illustrated, the elements within the analysis container 90 cannot access the agreements and credentials within temporary storage of the proxy container. Further, the elements within the analysis container cannot request data from the data owner computing entity 65 (e.g., shareable data DB 74) without sending the request through the proxy. This increases security as the elements of the analysis container cannot access information on the credentials and the agreements. This further improves ensuring elements within the analysis container are operating in accordance with one or more parameters of one or more agreements.

In an example, the agreements 86 include, but are not limited to, data access restrictions, data access request options, results output requirements, fee limitations, amount of data processing limitations, identities of data owners for certain query types, types of requests, parameters of requests, and time restrictions. For example, an agreement 86 includes a time restriction for a first data owner computing entity that restricts data access requests of query type A between the hours of 12 and 5 post meridiem (PM) eastern standard time (EST). As another example, an agreement 86 includes a type of data access requests allowed and a fee limitation for the request. For example, the agreement 86 allows data access requests that are regarding non-profit queries that are at least a minimum of $100 charged for the processing of the data query. As another example, the agreement restricts data access requests that are not regarding infectious disease studies.

Figure 5D:
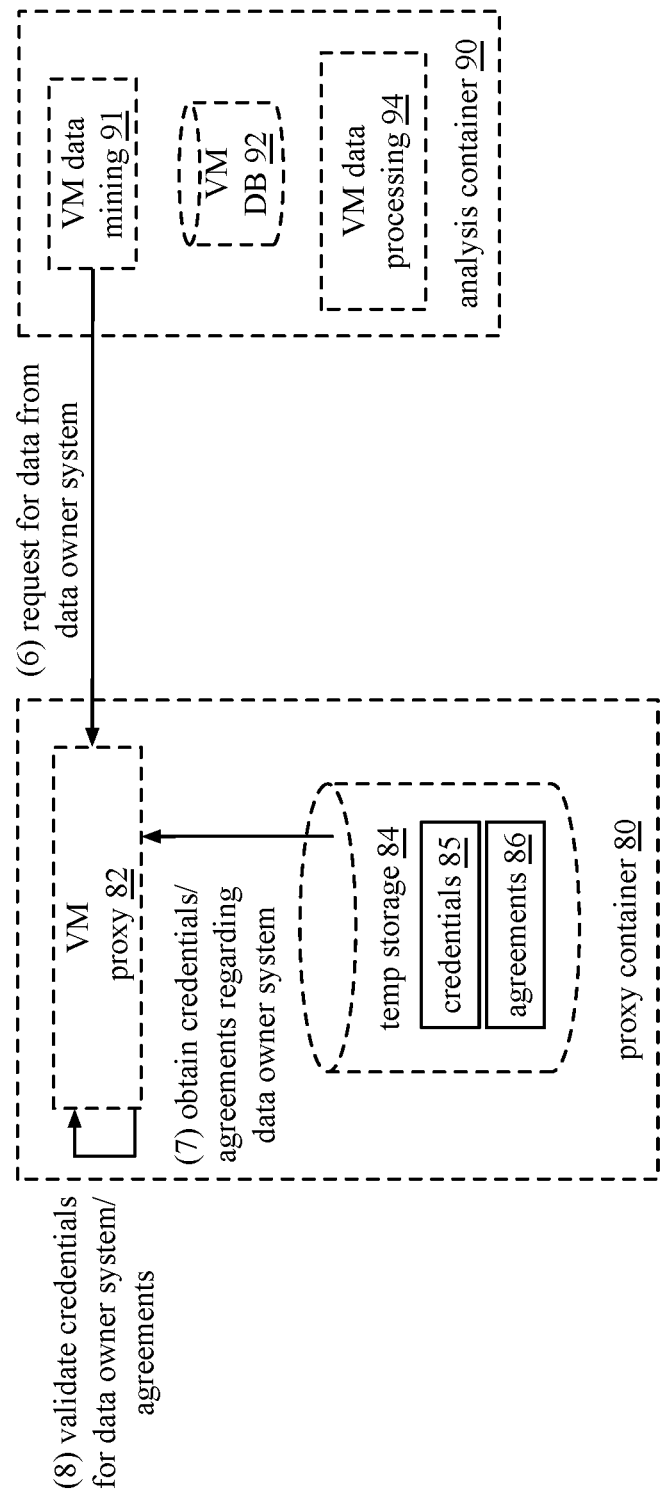

FIG. 5D illustrates the VM data mining 91 sending (6) a request for data (e.g., based on a query, a query, etc.) from one or more data owner computing entities to the virtual machine (VM) proxy 82. Having received the request, the VM proxy 82 obtains (7) credentials for the one or more data owner computing systems or entities. In an example, the VM proxy may also obtain (7) agreements associated with the first data owner computing system, the data processing system, and/or a data consumer computing entity regarding the request. For example, the VM proxy obtains an agreement stored in temporary storage 84.

The virtual machine (VM) proxy 82 then validates (8) the credentials for the one or more data owner systems associated with the data processing request. For example, when the request for data is from a first data owner computing system, the VM proxy determines whether a credential stored in the temporary storage is associated with the first data owner computing system. In an example, the VM proxy also determines whether the request is in accordance with an agreement. For example, the VM proxy determines whether an agreement stored in temporary storage 84 allows for the particular request. When the credentials are validated and the request is in accordance with the agreement (e.g., when utilizing agreements for processing requests), the VM proxy determines the request is valid (e.g., favorable). When the credentials are not validated and/or the request is not in accordance with the agreement, the VM proxy determines the request is invalid (e.g., unfavorable). When the request is invalid, the VM proxy may deny the request, send a response to the VM data mining with an indication the request was denied, and/or determine to initiate a teardown procedure.

Figure 5E:
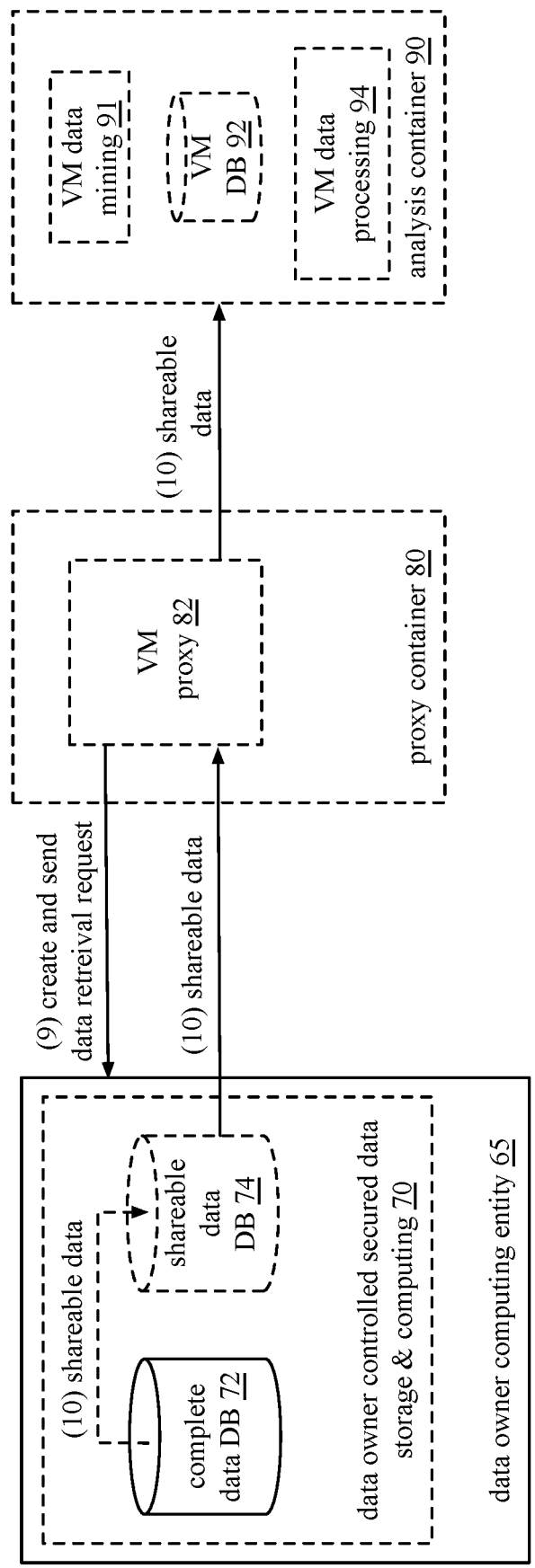

FIG. 5E illustrates that when the VM proxy validates the credentials, the VM proxy creates (9) and sends a data retrieval request to the data owner computing entity based on the request and the data access credentials associated with the data owner system. For example, the data retrieval request includes the request and the credential for the data owner computing entity. Having received the request, the data owner computing entity processes the request to produce shareable data. In one example, the data owner computing entity 65 processes shareable data and stores the shareable data in shareable data DB 74 prior to receiving the data retrieval request. Upon receiving the request, the data owner computing entity 65 selects a set of shareable data records as the shareable data from the shareable data DB 74. In another example, the data owner computing entity extracts shareable data from the complete data DB and stores it in the shareable data DB 74 upon receiving the data retrieval request.

Having selected and/or extracted the shareable data, the data owner computing entity 65 sends (10) the shareable data to the VM proxy 82. The VM proxy 82 forwards (10) the shareable data to the analysis container (e.g., to the VM 91-94) for storage and subsequent processing. For example, the VM proxy forwards the shareable data to the VM data mining 91. As another example, the VM proxy forwards the shareable data to the analysis container 90 for storage in the VM DB 92. As another example, the VM proxy forwards the shareable data to the VM data processing 94.

Figure 5F:
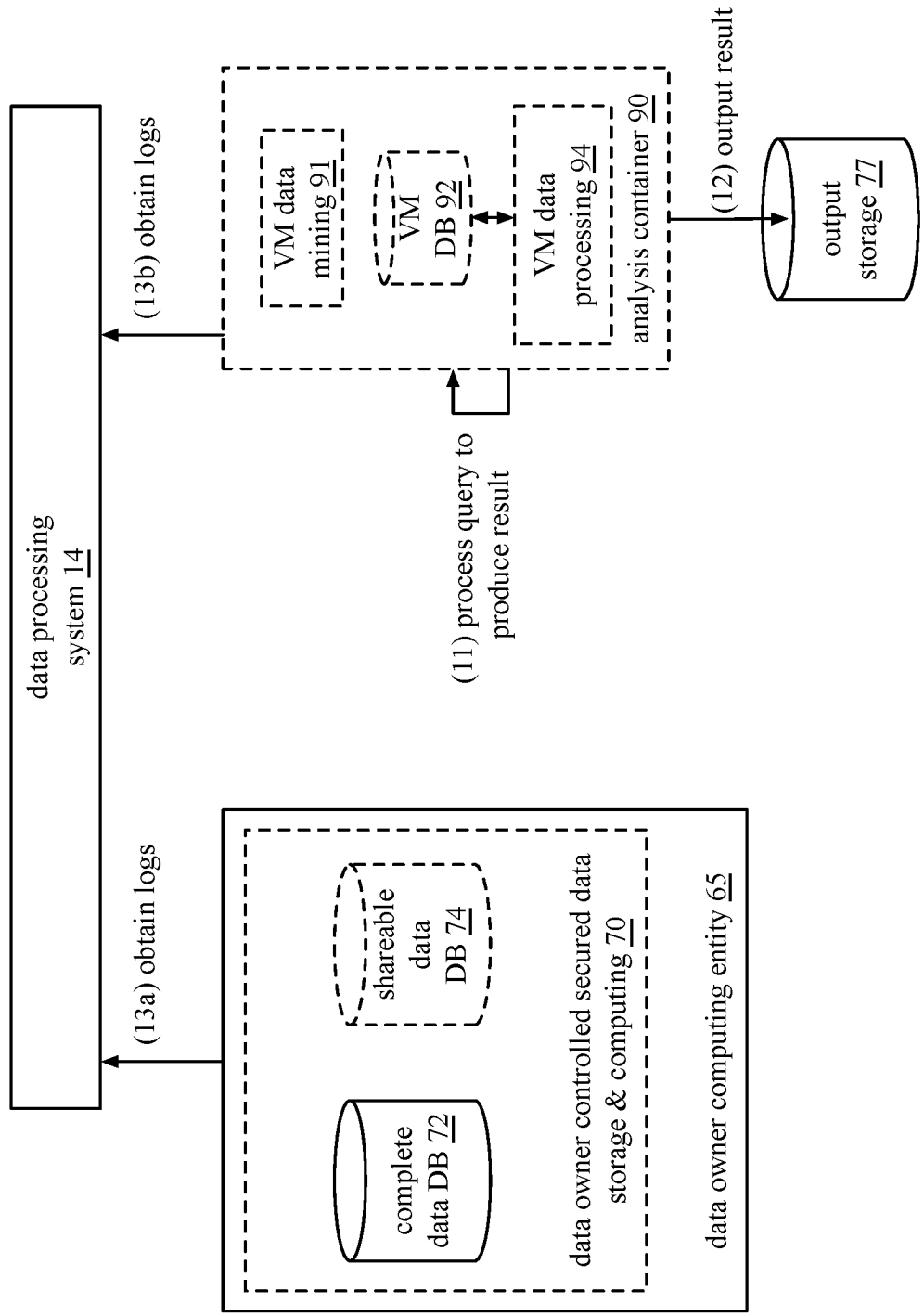

FIG. 5F illustrates processing (11) the query to produce a result. For example, the VM data processing 94 executes a function on the shareable data to produce a result. Having produced the result, the VM data processing outputs (12) the result to output storage 77. The data processing system 14 obtains logs (e.g., information on steps 1-12) at steps 13*a*-*b*. In an example, the logs include storing data (e.g., metadata) regarding the query (e.g., parameters, participants, etc.) such that the query could be repeated.

FIGS. 5G-H show an alternative example of steps 11-12 of FIG. 5F. FIG. 5G illustrates the VM data processing 94 communicating with the VM DB 92 via proxy 82 to execute the function on the shareable data. FIG. 5H illustrates the VM data processing 94 sending the result to output storage 77 via VM proxy 82. This allows for the VM proxy to also restrict what functions are executed on the shareable data, and also what and how much data can be output. For example, when the VM data processing attempts to execute a first function (e.g., that consumes a first amount of processing resources), the VM proxy determines whether the first function is in accordance with an agreement (e.g., is the first amount less than or equal to an amount of processing resources threshold of the agreement).

As another example, when the VM data processing stores the result, the VM proxy may restrict information outside of the result in accordance with an agreement. For example, when the agreement allows for 4 GB of data to be output to output storage 77, the VM proxy 82 may deny a request to store a result that includes 5 GB of data to be stored in the output storage 77.

Figure 5I:
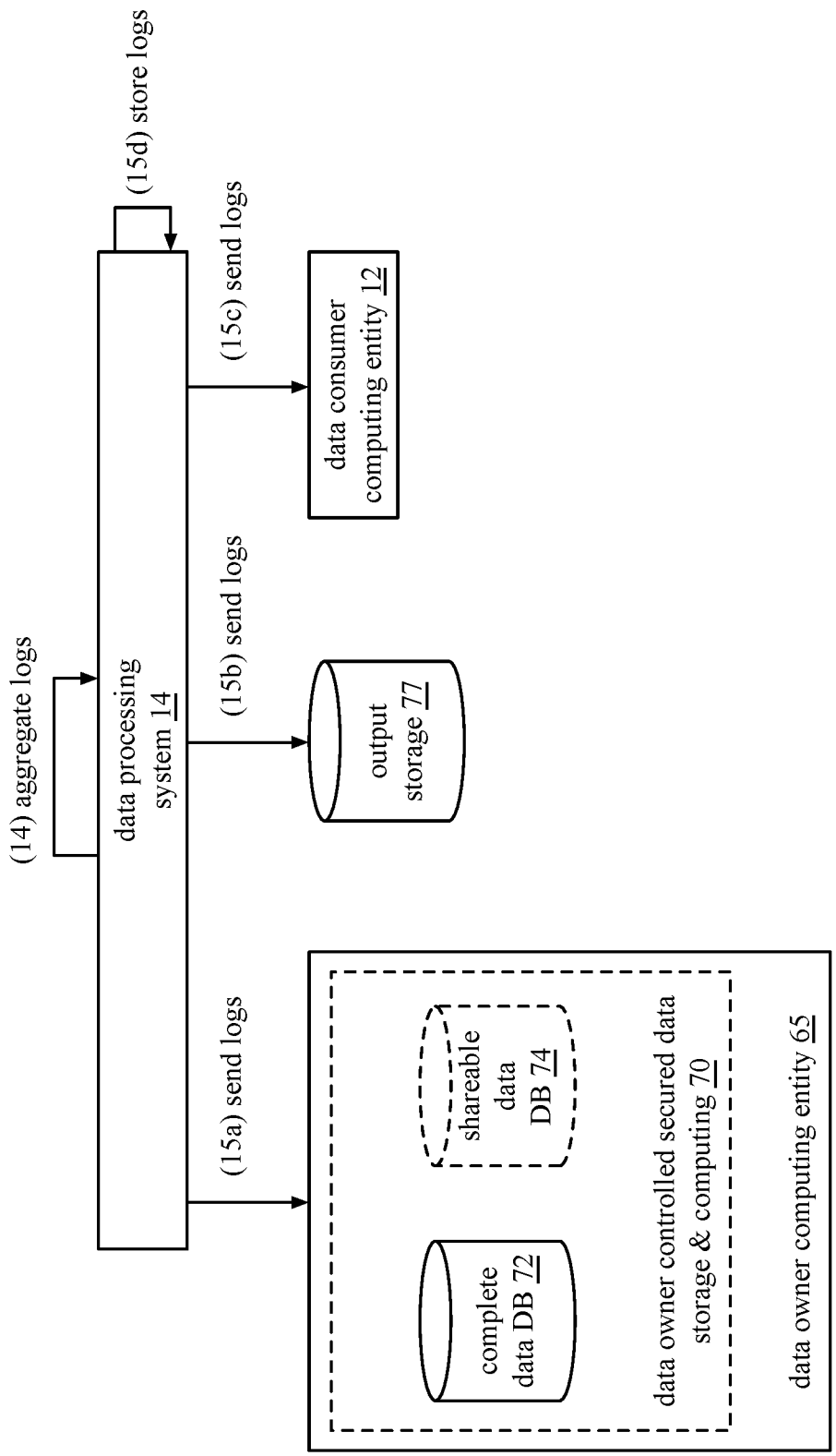

FIG. 5I illustrates the data processing system 14 aggregating (14) the logs and sending the log data (15*a*-*c*) to the data owner computing entitiy 65, the data consumer computing entity 12, and an output storage 77. Note the output storage 77 is able to be accessed by and/or is under the control of the data processing system 14. The data processing system 14 may also store (15*d*) logs in memory of the data processing system.

Figure 5J:
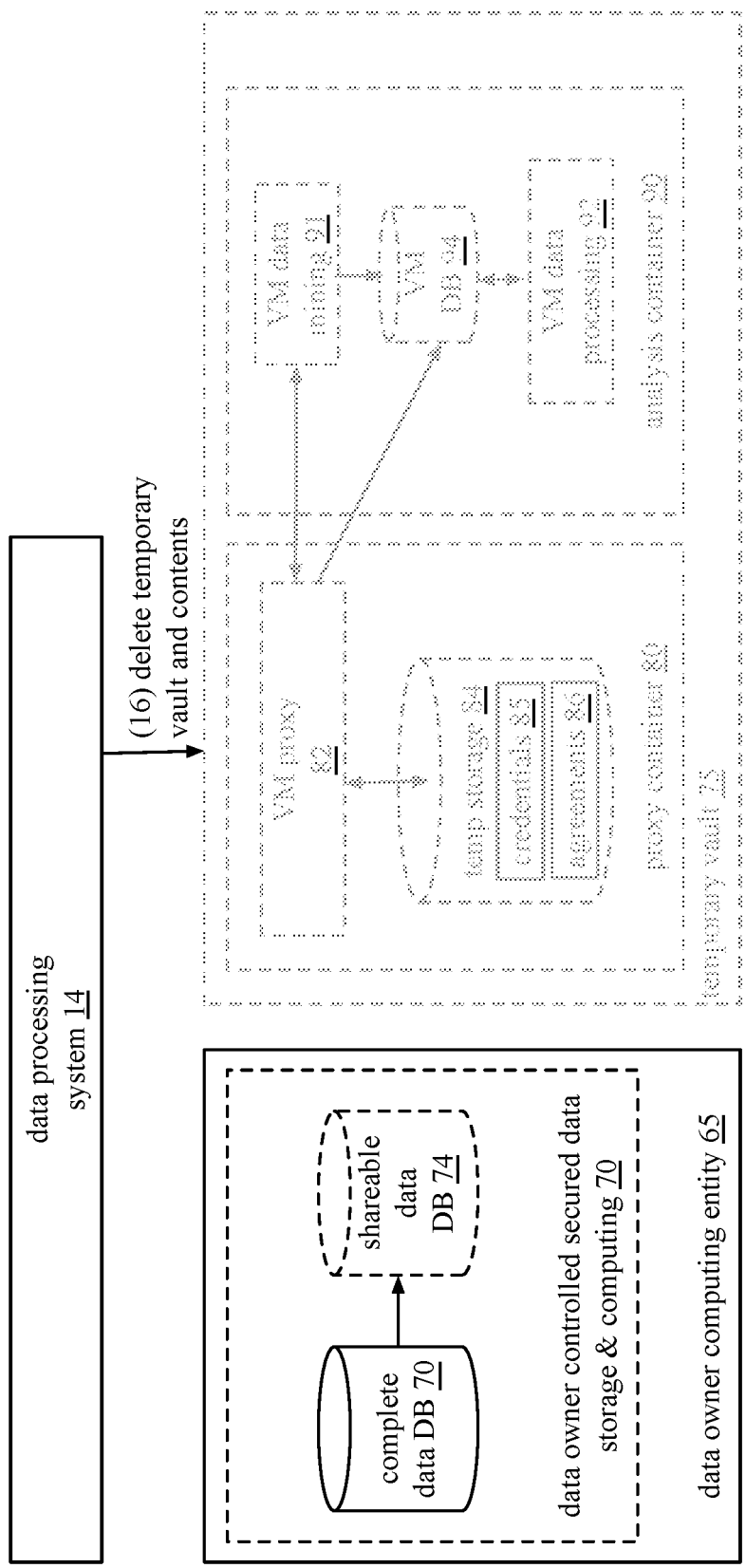

FIG. 5J illustrates the data processing system deleting (16) the temporary vault and its contents. For example, when the result satisfies a last query, the data processing system determines to delete (e.g., teardown) the temporary vault and its contents. As another example, when a timeframe for processing a query has ended, the data processing system determines to delete the temporary vault and its contents. As yet another example, when an amount of data processed has exceeded a data processing threshold (e.g., according to an agreement), the data processing system determines to delete the temporary vault and its contents.

FIG. 5K is a logic flowchart of an example of a method of securely processing shareable data via a vault proxy. The method begins or continues with step 200, where the data processing system creates a proxy for a virtual vault (e.g., temporary vault 75) to access a data owner system in accordance with a temporary credential protocol (e.g., based on credentials of the data owner system). In an example, the data processing system creates a proxy container and an analysis container within the virtual vault, where the proxy and a temporary storage is within the proxy container and a virtual machine is within the analysis container.

The method continues to step 202, where the proxy receives a request from a virtual machine within the virtual vault regarding data from a data owner system. When the request is valid, the method continues to step 204, where the proxy creates a data retrieval request based on the request and the data access credentials of the proxy with respect to the data owner system.

In an example, the proxy determines the request is valid when the request is from an entity (e.g., virtual machine, computing device) within the virtual vault. For example, to gain access to the virtual vault, the entity must have access to credentials for the virtual vault. As another example, the proxy determines the request is valid when the request includes a valid secondary identifier (e.g., received code from multi-factor authorization process that matches a generated code, etc.).

The method continues with step 206, where the proxy forwards a data response from the data owner system to the virtual machine. The method continues to step 208, where the data processing system deletes the virtual vault when a data query has been completed and the request is in accordance with the data query.

In an example, the virtual machine modifies a data record of the data to render identity of the object to be substantially unknowable, where the data includes a set of data records that includes the data record that includes a plurality of data fields. A first set of data fields of the plurality of data fields is regarding identification (e.g., protected health information (PHI), personally identifiable information (PII), etc) of an object of the data record and a second set of data fields of the plurality of data fields is regarding data regarding the object. In an instance, the modifying the data record includes altering content of the first set of data fields.

In an embodiment, the modifying the data record includes altering content of the first set of data fields to render identity of the object to be substantially unknowable (e.g., removing PHI, removing PII, etc.). In another embodiment, the modifying the data record further includes altering content of the second set of data fields (e.g., when determining a likelihood the identity of the object could be determined based on content of the second set of data fields is above a privacy threshold). As another example, the modifying further includes normalizing the set of data records to produce the set of shareable data records.

The altering may include one or more of a variety of approaches. A first approach includes deleting the content of the first set of data fields. For example, bits of the content may be written with all 1's or all 0's. A second approach includes obfuscating the content of the first set of data fields. For example, bits of the content may be scrambled, and/or rearranged. A third approach includes replacing the content of the first set of data fields with generic content. For example, bits of the content are replaced with generic bits.

In addition to obtaining credentials, the method may further include the proxy obtaining an agreement from temporary storage of the virtual vault, where the agreement includes parameters for data queries that are valid (e.g., allowed in accordance with the agreement) within the virtual vault. The proxy determines, based on the parameters, whether the data access request is in accordance with the parameters. When the data access request is in accordance with the parameters, determining the data access request is valid.

In an example, the proxy also receives a second request from the virtual machine within the virtual vault, where the second request is requesting second data from a second data owner system. When the second request is valid, the proxy creates a second data retrieval request based on the second request and data access credentials of the proxy with respect to the second data owner system. The proxy forwards a second data response from the second data owner system to the second virtual machine.

In another example, the proxy receives a second request from a second virtual machine within the virtual vault, wherein the second request is requesting second data from the data owner system. When the second request is valid, the proxy creates a second data retrieval request based on the second request and data access credentials of the proxy with respect to the data owner system. The proxy then forwards a second data response from the data owner system to the second virtual machine.

In yet another example, the proxy receives a second request from a second virtual machine within the virtual vault, wherein the second request is requesting second data from a second data owner system. When the second request is valid, the proxy creates a second data retrieval request based on the second request and data access credentials of the proxy with respect to the data owner system. The proxy then forwards a second data response from the second data owner system to the second virtual machine.

Note a computer readable storage device or medium stores operational instructions, that when executed by a computing device of the data processing system, causes the computing device to perform one or more functions and/or steps associated with the preceding figures.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
creating, by a data processing system, a proxy for a virtual vault to access a data owner system in accordance with a temporary credential protocol between the data processing system and the data owner system, wherein the proxy is an only conduit between the virtual vault and the data owner system;
creating, by the data processing system, an analysis container, wherein the analysis container includes a virtual machine;
receiving, by the proxy, a request from the virtual machine within the virtual vault, wherein the request is requesting data from the data owner system;
when the request is valid, creating by the proxy, a data retrieval request based on the request and data access credentials associated with the data owner system;
forwarding, by the proxy, a data response from the data owner system to the virtual machine; and
deleting, by the data processing system, the proxy and the virtual vault when a data query has been completed, wherein the request is in accordance with the data query.

2. The method of claim 1 further comprises:
creating, by the data processing system, a proxy container, wherein the proxy container includes the proxy.

3. The method of claim 2 further comprises:
creating, by the data processing system, temporary storage within the proxy container, wherein the temporary storage stores the data access credentials of the proxy.

4. The method of claim 1, wherein the data access credentials include one or more of:
a token;
a public/private keypair;
multi-factor authentication;
a username;
a password; and
an access key identifier and secret access key.

5. The method of claim 1 further comprises:
receiving, by the proxy, a second request from the virtual machine within the virtual vault, wherein the second request is requesting second data from the data owner system;
when the second request is valid, creating by the proxy, a second data retrieval request based on the second request and data access credentials of the proxy with respect to the data owner system; and
forwarding, by the proxy, a second data response from the data owner system to the virtual machine.

6. The method of claim 1 further comprises:
receiving, by the proxy, a second request from a second virtual machine within the virtual vault, wherein the second request is requesting second data from the data owner system;
when the second request is valid, creating by the proxy, a second data retrieval request based on the second request and data access credentials of the proxy with respect to the data owner system; and
forwarding, by the proxy, a second data response from the data owner system to the second virtual machine.

7. The method of claim 1 further comprises:
receiving, by the proxy, a second request from the virtual machine within the virtual vault, wherein the second request is requesting second data from a second data owner system;
when the second request is valid, creating by the proxy, a second data retrieval request based on the second request and data access credentials of the proxy with respect to the second data owner system; and
forwarding, by the proxy, a second data response from the second data owner system to the virtual machine.

8. The method of claim 1 further comprises:
modifying, by the virtual machine, a data record of the data to render identity of an object of the data record to be substantially unknowable, wherein the data includes a set of data records that includes the data record, wherein the data record includes a plurality of data fields, wherein a first set of data fields of the plurality of data fields is regarding identification of an object of the data record and a second set of data fields of the plurality of data fields is regarding data regarding the object, and wherein the modifying the data record includes altering content of the first set of data fields.

9. The method of claim 1 further comprises:
obtaining, by the proxy, an agreement from temporary storage of the virtual vault, wherein the agreement includes parameters for data queries that are valid within the virtual vault;
determining, by the proxy and based on the parameters, whether the request is in accordance with the parameters; and
when the request is in accordance with the parameters, determining the request is valid.

10. A non-transitory computer readable storage medium comprises:
a first memory section that stores operational instructions, that when executed by a computing device of a data processing system, causes the computing device to:
create a proxy for a virtual vault to access a data owner system in accordance with a temporary credential protocol between the data processing system and the data owner system, wherein the proxy is an only conduit between the virtual vault and the data owner system;
create an analysis container, wherein the analysis container includes a virtual machine;
a second memory section that stores operational instructions, that when executed by the proxy, causes the proxy to:
receive a request from the virtual machine within the virtual vault, wherein the request is requesting data from the data owner system;
when the request is valid, create a data retrieval request based on the request and data access credentials associated with the data owner system; and
forward a data response from the data owner system to the virtual machine; and
a third memory section that stores operational instructions, that when executed by the computing device, causes the computing device to:
delete the proxy and the virtual vault when a data query has been completed, wherein the request is in accordance with the data query.

11. The non-transitory computer readable storage medium of claim 10, wherein the first memory section stores further operational instructions, that when executed by the computing device, causes the computing device to:
create a proxy container, wherein the proxy container includes the proxy.

12. The non-transitory computer readable storage medium of claim 11, wherein the first memory section stores further operational instructions, that when executed by the computing device, causes the computing device to:
create temporary storage within the proxy container, wherein the temporary storage stores the data access credentials of the proxy.

13. The non-transitory computer readable storage medium of claim 10, wherein the data access credentials include one or more of:
a token;
a public/private keypair;
multi-factor authentication;
a username;
a password; and
an access key identifier and secret access key.

14. The non-transitory computer readable storage medium of claim 10 further comprises:
a fourth memory section for storing operational instructions that, when executed by the proxy, cause the proxy to:
receive a second request from the virtual machine within the virtual vault, wherein the second request is requesting second data from the data owner system;
when the second request is valid, create, a second data retrieval request based on the second request and data access credentials of the proxy with respect to the data owner system; and
forward a second data response from the data owner system to the virtual machine.

15. The non-transitory computer readable storage medium of claim 10 further comprises:
a fourth memory section for storing operational instructions that, when executed by the proxy, cause the proxy to:
receive a second request from a second virtual machine within the virtual vault, wherein the second request is requesting second data from the data owner system;
when the second request is valid, create a second data retrieval request based on the second request and data access credentials of the proxy with respect to the data owner system; and
forward a second data response from the data owner system to the second virtual machine.

16. The non-transitory computer readable storage medium of claim 10 further comprises:
a fourth memory section for storing operational instructions that, when executed by the proxy, cause the proxy to:
receive a second request from the virtual machine within the virtual vault, wherein the second request is requesting second data from a second data owner system;
when the second request is valid, create a second data retrieval request based on the second request and data access credentials of the proxy with respect to the second data owner system; and
forward a second data response from the second data owner system to the virtual machine.

17. The non-transitory computer readable storage medium of claim 10 further comprises:
a fourth memory section for storing operational instructions that, when executed by the virtual machine, cause the virtual machine to:
modify a data record of the data to render identity of an object of the data record to be substantially unknowable, wherein the data includes a set of data records that includes the data record, wherein the data record includes a plurality of data fields, wherein a first set of data fields of the plurality of data fields is regarding identification of an object of the data record and a second set of data fields of the plurality of data fields is regarding data regarding the object, and wherein the modifying the data record includes altering content of the first set of data fields.

18. The non-transitory computer readable storage medium of claim 10 further comprises:
a fourth memory section for storing operational instructions that, when executed by the proxy, cause the proxy to:
obtain an agreement from temporary storage of the virtual vault, wherein the agreement includes parameters for data queries that are valid within the virtual vault;
determine, based on the parameters, whether the request is in accordance with the parameters; and
when the request is in accordance with the parameters, determine the request is valid.

* * * * *